(12) United States Patent
Nabeshima et al.

(10) Patent No.: US 7,430,342 B2
(45) Date of Patent: Sep. 30, 2008

(54) IMAGE PROCESSING APPARATUS AND IMAGE PROCESSING PROGRAM TO PERFORM IMAGE DATA RESOLUTION CONVERSION

(75) Inventors: Takayuki Nabeshima, Chiyoda-ku (JP); Kazuhiro Ishiguro, Chiyoda-ku (JP); Hideyuki Toriyama, Chiyoda-ku (JP); Hiroyuki Suzuki, Chiyoda-ku (JP); Toru Maegawa, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 589 days.

(21) Appl. No.: 10/980,435

(22) Filed: Nov. 4, 2004

(65) Prior Publication Data

US 2005/0212718 A1 Sep. 29, 2005

(30) Foreign Application Priority Data

Mar. 29, 2004 (JP) ............................. 2004-096412

(51) Int. Cl.
*G06K 9/32* (2006.01)
*G06K 9/40* (2006.01)
*G09G 5/00* (2006.01)
*G06K 9/36* (2006.01)

(52) U.S. Cl. .................... 382/299; 345/3.3; 382/254

(58) Field of Classification Search ................. 382/299, 382/286, 254, 258, 260, 266, 267, 268, 269, 382/275; 358/1.9, 1.2, 3.07; 345/698, 699, 345/3.3
See application file for complete search history.

(56) References Cited

U.S. PATENT DOCUMENTS

| 5,138,672 | A | 8/1992 | Hirabayashi et al. |
| 5,309,524 | A | 5/1994 | Hirabayashi et al. |
| 5,371,606 | A | 12/1994 | Katayama et al. |
| 6,876,763 | B2 * | 4/2005 | Sorek et al. ................. 382/162 |

FOREIGN PATENT DOCUMENTS

| JP | 57-048154 A | 3/1982 |
| JP | 02-156771 A | 6/1990 |
| JP | 02-177766 A | 7/1990 |
| JP | 05-219359 A | 8/1993 |
| JP | 07-184043 | 7/1995 |

* cited by examiner

*Primary Examiner*—Yon Couso
(74) *Attorney, Agent, or Firm*—Morrison & Foerster LLP

(57) ABSTRACT

In order to prevent the appearance of gaps in fine lines when image data undergoes resolution conversion, the image processing apparatus includes an image reading unit that inputs image data, a fine line detection unit 113 that detects fine lines from the image data, a resolution conversion unit 111 that converts the image data to a prescribed resolution, and a fine line restoration unit 114 that restores fine lines in the image data that has undergone resolution conversion.

12 Claims, 21 Drawing Sheets

(A)

| 0 | 0 | 0 | 0 | 0 | 0 | 0 | 0 | 0 | 0 | 0 |
|---|---|---|---|---|---|---|---|---|---|---|
| 0 | 210 | 0 | 0 | 255 | 200 | 0 | 230 | 255 | 240 | 0 |
| 0 | 255 | 0 | 0 | 255 | 255 | 0 | 255 | 255 | 255 | 0 |
| 0 | 210 | 0 | 0 | 255 | 255 | 0 | 255 | 255 | 255 | 0 |
| 0 | 190 | 0 | 0 | 255 | 255 | 0 | 255 | 255 | 255 | 0 |
| 0 | 60 | 0 | 0 | 255 | 255 | 0 | 235 | 255 | 255 | 0 |
| 0 | 205 | 0 | 0 | 255 | 255 | 0 | 255 | 255 | 245 | 0 |
| 0 | 210 | 0 | 0 | 255 | 255 | 0 | 255 | 255 | 255 | 0 |
| 0 | 255 | 0 | 0 | 255 | 255 | 0 | 255 | 255 | 255 | 0 |
| 0 | 255 | 0 | 0 | 255 | 255 | 0 | 255 | 255 | 255 | 0 |
| 0 | 210 | 0 | 0 | 220 | 255 | 0 | 210 | 255 | 255 | 0 |
| 0 | 0 | 0 | 0 | 0 | 0 | 0 | 0 | 0 | 0 | 0 |

IMAGE DATA (B)

(A)

| 0 | 0 | 0 | 0 | 0 | 0 |
|---|---|---|---|---|---|
| 105 | 0 | 228 | 115 | 248 | 0 |
| 128 | 0 | 255 | 128 | 255 | 0 |
| 105 | 0 | 255 | 128 | 255 | 0 |
| 95 | 0 | 255 | 128 | 255 | 0 |
| 30 | 0 | 255 | 118 | 255 | 0 |
| 103 | 0 | 255 | 128 | 250 | 0 |
| 105 | 0 | 255 | 128 | 255 | 0 |
| 128 | 0 | 255 | 128 | 255 | 0 |
| 128 | 0 | 255 | 128 | 255 | 0 |
| 105 | 0 | 238 | 105 | 255 | 0 |
| 0 | 0 | 0 | 0 | 0 | 0 |

MAIN SCANNING DIRECTION-REDUCED CONVERTED IMAGE

(B)

| | | | | | |
|---|---|---|---|---|---|
| | ○ | | □ | ○ | □ |
| | ○ | | □ | ○ | □ |
| | ○ | | □ | ○ | □ |
| | △ | | □ | ○ | □ |
| | | | □ | ○ | □ |
| | ○ | | □ | ○ | □ |
| | ○ | | □ | ○ | □ |
| | ○ | | □ | ○ | □ |
| | ○ | | □ | ○ | □ |
| | ○ | | □ | ○ | □ |
| | | | | | |

| 52.5 | 0 | 114 | 57.5 | 124 | 0 |
|---|---|---|---|---|---|
| 116 | 0 | 255 | 128 | 255 | 0 |
| 100 | 0 | 255 | 123 | 255 | 0 |
| 62.5 | 0 | 255 | 128 | 253 | 0 |
| 128 | 0 | 255 | 128 | 255 | 0 |
| 52.5 | 0 | 119 | 52.5 | 128 | 0 |

RESOLUTION-CONVERTED IMAGE (B)

|   |   | ○ |   | ○ |   |
|---|---|---|---|---|---|
| ○ |   | □ | ○ | □ |   |
| △ |   | □ | ○ | □ |   |
|   |   | □ | ○ | □ |   |
| ○ |   | □ | ○ | □ |   |
|   |   | ○ |   | ○ |   |

LINE THINNING FILTER

| V11 | V12 | V13 |
|-----|-----|-----|
| V21 | V22 | V23 |
| V31 | V32 | V33 |

REPLACE TARGET PIXEL (V22) DATA
WITH max (V11–V33)

FIG.7

LINE THICKENING FILTER

| V11 | V12 | V13 |
|-----|-----|-----|
| V21 | V22 | V23 |
| V31 | V32 | V33 |

REPLACE TARGET PIXEL (V22) DATA
WITH min (V11–V33)

FIG.8

| 0 | 0 | 0 | 0 | 0 | 0 | 0 | 0 | 0 | 0 | 0 |
|---|---|---|---|---|---|---|---|---|---|---|
| 0 | 210 | 0 | 0 | 255 | 200 | 0 | 230 | 255 | 240 | 0 |
| 0 | 255 | 0 | 0 | 255 | 255 | 0 | 255 | 255 | 255 | 0 |
| 0 | 210 | 0 | 0 | 255 | 255 | 0 | 255 | 255 | 255 | 0 |
| 0 | 190 | 0 | 0 | 255 | 255 | 0 | 255 | 255 | 255 | 0 |
| 0 | 60 | 0 | 0 | 255 | 255 | 0 | 235 | 255 | 255 | 0 |
| 0 | 205 | 0 | 0 | 255 | 255 | 0 | 255 | 255 | 245 | 0 |
| 0 | 210 | 0 | 0 | 255 | 255 | 0 | 255 | 255 | 255 | 0 |
| 0 | 255 | 0 | 0 | 255 | 255 | 0 | 255 | 255 | 255 | 0 |
| 0 | 255 | 0 | 0 | 255 | 255 | 0 | 255 | 255 | 255 | 0 |
| 0 | 210 | 0 | 0 | 220 | 255 | 0 | 210 | 255 | 255 | 0 |
| 0 | 0 | 0 | 0 | 0 | 0 | 0 | 0 | 0 | 0 | 0 |

ORIGINAL IMAGE

| 0 | 0 | 0 | 0 | 0 | 0 | 0 | 0 | 0 | 0 | 0 |
|---|---|---|---|---|---|---|---|---|---|---|
| 0 | 1 | 0 | 0 | 1 | 1 | 0 | 1 | 1 | 1 | 0 |
| 0 | 1 | 0 | 0 | 1 | 1 | 0 | 1 | 1 | 1 | 0 |
| 0 | 1 | 0 | 0 | 1 | 1 | 0 | 1 | 1 | 1 | 0 |
| 0 | 1 | 0 | 0 | 1 | 1 | 0 | 1 | 1 | 1 | 0 |
| 0 | 1 | 0 | 0 | 1 | 1 | 0 | 1 | 1 | 1 | 0 |
| 0 | 1 | 0 | 0 | 1 | 1 | 0 | 1 | 1 | 1 | 0 |
| 0 | 1 | 0 | 0 | 1 | 1 | 0 | 1 | 1 | 1 | 0 |
| 0 | 1 | 0 | 0 | 1 | 1 | 0 | 1 | 1 | 1 | 0 |
| 0 | 1 | 0 | 0 | 1 | 1 | 0 | 1 | 1 | 1 | 0 |
| 0 | 1 | 0 | 0 | 1 | 1 | 0 | 1 | 1 | 1 | 0 |
| 0 | 1 | 0 | 0 | 1 | 1 | 0 | 1 | 1 | 1 | 0 |
| 0 | 0 | 0 | 0 | 0 | 0 | 0 | 0 | 0 | 0 | 0 |

BINARY IMAGE

(B)

(A)

| 0 | 0 | 0 | 0 | 0 | 0 | 0 | 0 | 0 | 0 | 0 |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 1 | 0 | 0 |
| 0 | 0 | 0 | 0 | 0 | 0 | 0 | 0 | 1 | 0 | 0 |
| 0 | 0 | 0 | 0 | 0 | 0 | 0 | 0 | 1 | 0 | 0 |
| 0 | 0 | 0 | 0 | 0 | 0 | 0 | 0 | 1 | 0 | 0 |
| 0 | 0 | 0 | 0 | 0 | 0 | 0 | 0 | 1 | 0 | 0 |
| 0 | 0 | 0 | 0 | 0 | 0 | 0 | 0 | 1 | 0 | 0 |
| 0 | 0 | 0 | 0 | 0 | 0 | 0 | 0 | 1 | 0 | 0 |
| 0 | 0 | 0 | 0 | 0 | 0 | 0 | 0 | 1 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

LINE-THINNED IMAGE (B)

(A)

| 0 | 0 | 0 | 0 | 0 | 0 | 0 | 0 | 0 | 0 | 0 |
|---|---|---|---|---|---|---|---|---|---|---|
| 0 | 1 | 0 | 0 | 1 | 1 | 0 | 0 | 0 | 0 | 0 |
| 0 | 1 | 0 | 0 | 1 | 1 | 0 | 0 | 0 | 0 | 0 |
| 0 | 1 | 0 | 0 | 1 | 1 | 0 | 0 | 0 | 0 | 0 |
| 0 | 1 | 0 | 0 | 1 | 1 | 0 | 0 | 0 | 0 | 0 |
| 0 | 1 | 0 | 0 | 1 | 1 | 0 | 0 | 0 | 0 | 0 |
| 0 | 1 | 0 | 0 | 1 | 1 | 0 | 0 | 0 | 0 | 0 |
| 0 | 1 | 0 | 0 | 1 | 1 | 0 | 0 | 0 | 0 | 0 |
| 0 | 1 | 0 | 0 | 1 | 1 | 0 | 0 | 0 | 0 | 0 |
| 0 | 1 | 0 | 0 | 1 | 1 | 0 | 0 | 0 | 0 | 0 |
| 0 | 1 | 0 | 0 | 1 | 1 | 0 | 0 | 0 | 0 | 0 |
| 0 | 0 | 0 | 0 | 0 | 0 | 0 | 0 | 0 | 0 | 0 |

FINE LINE IMAGE (B)

(A)

| 0 | 0 | 0 | 0 | 0 | 0 |
|---|---|---|---|---|---|
| 210 | 0 | 255 | 230 | 255 | 0 |
| 255 | 0 | 255 | 255 | 255 | 0 |
| 210 | 0 | 255 | 255 | 255 | 0 |
| 190 | 0 | 255 | 255 | 255 | 0 |
| 60 | 0 | 255 | 235 | 255 | 0 |
| 205 | 0 | 255 | 255 | 255 | 0 |
| 210 | 0 | 255 | 255 | 255 | 0 |
| 255 | 0 | 255 | 255 | 255 | 0 |
| 255 | 0 | 255 | 255 | 255 | 0 |
| 210 | 0 | 255 | 210 | 255 | 0 |
| 0 | 0 | 0 | 0 | 0 | 0 |

MAIN SCANNING
DIRECTION-REDUCED
CONVERTED IMAGE (B)

(A)

| 210 | 0 | 255 | 230 | 255 | 0 |
|-----|---|-----|-----|-----|---|
| 255 | 0 | 255 | 255 | 255 | 0 |
| 210 | 0 | 255 | 255 | 255 | 0 |
| 190 | 0 | 255 | 255 | 255 | 0 |
| 255 | 0 | 255 | 255 | 255 | 0 |
| 210 | 0 | 255 | 210 | 255 | 0 |

SECONDARY SCANNING DIRECTION-REDUCED CONVERTED IMAGE

(B)

IMAGE PROCESSING APPARATUS AND IMAGE PROCESSING PROGRAM TO PERFORM IMAGE DATA RESOLUTION CONVERSION

This application is base on Japanese Application No. 2004-096412 filed in Japan on Mar. 29, 2004, the entire content of which is hereby incorporated by reference.

BACKGROUND OF THE INVENTION

1. Field of the Invention

The present invention relates to an image processing apparatus and image processing program, and more particularly, to an image processing apparatus and image processing program that perform image data resolution conversion.

2. Description of the Related Art

Increasingly in recent years, image data obtained via reading of an original document by a scanner or the like, or image data obtained via photo-taking using a photo-taking apparatus such as a digital camera, has come to be recorded and stored on a recording medium such as a hard disk. Furthermore, such image data is also sent to other computers over a network, such as the Internet or the LAN.

Increasing the vividness of the image requires an increase in the resolution of the image data, which in turn increases the amount of data. Therefore, in order to effectively utilize the recording medium and network, means by which to reduce the amount of data is desired. As technologies by which to reduce the data amount of image data, various data compression technologies such as JPEG (Joint Photographic Experts Group) are available. However, even where a data compression technology is used, the degree to which the image data can be compressed and reduced in size is limited. Accordingly, even though it does result in decreased image quality, the amount of image data can be reduced significantly by reducing the resolution of the image data. However, if the resolution is decreased, the image quality is reduced as well. In other words, there is a trade-off between reducing the data amount and maintaining image quality. Therefore, the user is forced to prioritize between the image quality or the data amount.

Incidentally, a noticeable phenomenon in connection with the reduction in image quality caused by a reduction in the resolution is the appearance of gaps in fine lines. Japanese Laid-Open Patent Application H7-184043 describes a resolution conversion device that includes: an edge detection/fine line detection unit that determines (i) whether or not a target pixel of input multiple-tone image data represents an edge based on the density of the surrounding pixels in the image data, including the target pixel, and (ii) if the target pixel represents an edge, whether or not the edge is a fine line; resolution characteristic-maintaining resolution conversion means that converts input multiple-tone image data to a prescribed resolution while maintaining its resolution characteristic; tone characteristic-maintaining resolution conversion means that converts input multiple-tone image data to a prescribed resolution while maintaining its tone characteristic; and, output selection means that (i) operates in response to the output from the edge detection/fine line detection unit, (ii) where the detection unit determines that the target pixel represents the edge area of fine line, selects and outputs the output from the resolution characteristic-maintaining resolution conversion means, and (iii) where the detection unit determines that the target pixel represents something other than the edge are of a fine line, selects and outputs the output from the tone characteristic-maintaining resolution conversion means.

However, Japanese Laid-Open Patent Application H7-184043 entails the problem that a complex circuit construction is required in order to perform image data resolution conversion using the two different methods. Furthermore, where resolution characteristic-maintaining resolution conversion that reduces the resolution of all fine lines is performed, if fine lines are close to each other in the pre-conversion image data, the problem occurs that the fine lines become too close to each other and cannot be easily distinguished from each other in the post-conversion image data.

OBJECT AND SUMMARY

An object of the present invention is to provide an image processing apparatus and image processing program that can eliminate the problems identified above, i.e., that can prevent gaps in fine lines when image data undergoes resolution conversion.

This object is attained by providing an image processing apparatus and image processing program having the construction described below.

In order to achieve the above object, according to one aspect of the present invention, the image processing apparatus, comprising: an input unit that inputs image data; a fine line detection unit that detects fine lines from the image data; a resolution conversion unit that converts the image data to a prescribed resolution; and a restoration unit that restores the fine lines detected in the resolution-converted image data.

According to this invention, because fine lines are detected from the image data and are restored in the image data after the image data undergoes prescribed resolution conversion, an image processing apparatus can be provided that prevents gaps in fine lines from appearing when the image data undergoes resolution conversion.

It is preferred that the image processing apparatus further comprising a gap detection unit that detects gaps in fine lines in the resolution-converted image data, wherein the restoration unit restore the detected gaps by the gap detection unit.

According to this invention, fine lines in the resolution-converted image data are restored. Because only fine lines are restored, there is no effect on regions in the resolution-converted image data other than the fine lines. As a result, the problem of characters and lines becoming broken and illegible can be prevented.

It is preferred that the image processing apparatus, wherein the fine line detection unit comprising; a binarization unit that binarizes image data, a line thinning unit that generates first image data created by replacing the pixel values in the binarized image data with the lowest pixel value among pixels in :a prescribed range, a line thickening unit that generates second image data by replacing the pixel values in the first image data with the higher pixel value among pixels in a prescribed range, and a fine line image generating unit that generates a fine line image by calculating the difference between the binarized image data and the second image.

According to this invention, fine lines to be preserved can be reliably detected.

It is preferred that the image processing apparatus, wherein the restoration unit replaces pixel values for gap pixels with the higher pixel value of the surrounding pixels.

According to this invention, because pixel values for gap pixels are replaced with the higher pixel value of the surrounding pixels, no pixel value deviates drastically from the values of the surrounding pixels. As a result, the appearance of filled gaps that are conspicuously different in appearance relative to the surrounding area can be prevented.

According to another aspect of the present invention, the image processing apparatus, comprising: an input unit that inputs image data, a fine line detection unit that detects fine lines from the image data, a pixel value correction unit that corrects a pixel values of fine lines detected from the image data, and a resolution conversion unit that converts the corrected image data to a prescribed resolution.

According to this invention, because the pixel values of fine lines in the image data are corrected prior to resolution conversion, fine lines can be reliably preserved after resolution conversion. Furthermore, there is no effect on regions in the resolution-converted image data other than fine lines. As a result, an image processing apparatus that can prevent the appearance of gaps in fine lines when image data undergoes resolution conversion can be provided.

It is preferred that the fine line detection unit detects fine lines having a thickness appropriate to the resolution to which the image data is converted by the resolution conversion unit.

According to this invention, because fine lines having a thickness appropriate to the resolution to which the image data undergoes resolution conversion are detected, only fine lines having a thickness appropriate to the pre-conversion resolution are restored. Depending on the pre-conversion resolution, some lines have a thickness that does not require restoration. These lines do not require restoration. As a result, unnecessary restoration of lines can be prevented, and the amount of processing can be reduced.

According to yet another aspect of the present invention, the image processing program executes on a computer the steps of: (a) inputting image data; (b) detecting fine lines from the input image data; (c) converting the image data to a prescribed resolution; and (d) restoring the fine lines detected in the resolution-converted image data.

According to this invention, because fine lines are detected from the image data and are restored in the image data converted to a prescribed resolution, an image processing program that can prevent the appearance of gaps in fine lines when image data undergoes resolution conversion can be provided.

According to yet another aspect of the present invention, the image processing program executes on a computer the steps of: (a) inputting image data; (b) detecting fine lines from the image data; (c) correcting the pixel values of the fine lines detected in the image data; and (d) converting the corrected image data to a prescribed resolution.

According to this invention, because the pixel values of the fine lines in the image data are corrected prior to resolution conversion, fine lines can be reliably preserved after resolution conversion. As a result, an image processing program that can prevent the appearance of gaps in fine lines when image data undergoes resolution conversion can be provided.

According to still another aspect of the present invention, the image processing apparatus comprises an image processing apparatus that converts image data into a different resolution and has a resolution conversion unit that converts first image data having a first resolution into a second resolution lower than the first resolution in order to obtain second image data, a gap detection unit that detects gaps in fine lines in the second image data that was obtained as a result of conversion by the resolution conversion unit, and a restoration unit that restores the gaps in fine lines detected by the gap detection unit.

According to this invention, gaps in fine lines in the resolution-converted second image data are detected and are restored, and an image processing apparatus that can prevent gaps in fine lines during resolution conversion of image data can be provided.

It is preferred that the image processing apparatus have a fine line detection unit that detects fine lines in the first image data, and that the gap detection unit detect gaps in fine lines based on the fine lines detected by the fine line detection unit and the second image data obtained as a result of conversion by the resolution conversion unit.

According to this invention, gaps in fine lines are detected and restored to their previous state based on the fine lines detected in the first image data and the second image data obtained as a result of resolution conversion. Consequently, because regions other than the fine lines are not restored in the resolution-converted second image data, characters and lines are prevented from becoming broken and illegible.

It is preferred that the fine line detection unit detects fine lines depending on the first resolution and the second resolution.

According to this invention, because the thickness of the fine lines that are detected changes in accordance with the first resolution and the second resolution, only fine lines having a thickness appropriate to the pre-conversion resolution or post-conversion resolution are restored. Depending on the post-conversion resolution, some lines in the pre-conversion resolution have a thickness that does not require restoration. These lines do not require restoration. As a result, unnecessary restoration of lines can be prevented, and the amount of processing can be reduced.

It is preferred that the restoration unit restores the gaps in fine lines detected by the gap detection unit to pixel values consistent with the surrounding pixels.

According to this invention, because gaps are restored to pixel values consistent with the surrounding pixels, no pixel value deviates drastically from the pixel values of surrounding pixels. As a result, restored gaps can be prevented from appearing conspicuously different from other areas.

BRIEF DESCRIPTION OF THE DRAWINGS

These and other objects and features of the present invention will become clear from the following description taken in conjunction with the preferred embodiments thereof with reference to the accompanying drawings, in which:

FIG. 4 shows a main scanning direction-reduced converted image wherein the number of pixels in the image data has been reduced by half in the main scanning direction (the horizontal direction in the drawing);

FIG. 7 shows an example of a line thinning filter used by the line thinning unit;

FIG. 8 shows an example of a line thickening filter used by the line thickening unit;

FIG. 9 shows image data as an arrangement of pixel values;

DETAILED DESCRIPTION OF THE PREFERRED EMBODIMENTS

Embodiments of the present invention will be described below with reference to the drawings. In the description below, identical symbols are assigned to identical components, which have the same names and functions therein. Therefore, these components will be described in detail only once.

In this embodiment, the pixel values of the image data are values falling within a range of 0-255, where a pixel value of 255 corresponds to black and a pixel value of 0 corresponds to white. As the pixel value increases, the pixel becomes closer to black, while the pixel becomes closer to white as the pixel value decreases.

First Embodiment

Figure 1:
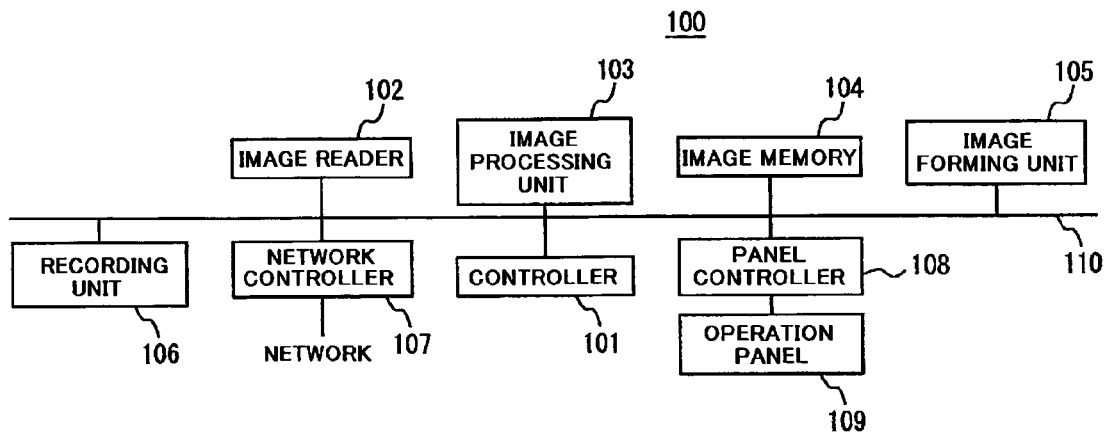
FIG. 1 shows the basic construction of the image processing apparatus of one embodiment of the present invention.

FIG. 1 shows the basic construction of an image processing apparatus comprising one embodiment of the present invention. Referring to FIG. 1, the image processing apparatus 100 includes a controller 101 that controls the overall operation of the image processing apparatus 100, an image reader 102 that reads an original document, an image processing unit 103 that executes compression and other processing of the image data, an image memory 104 that temporarily stores the images read by the image reader 102, an image forming unit 105 that forms images on paper or other recording medium based on the image data, a storage unit 106 that stores image data or compressed image data, a network controller 107 that connects the image processing apparatus 100 to a network, an operation panel 109 that receives user input for various operations, and a panel controller 108 that controls the operation panel 109, all of which are connected to a bus line 110.

The image processing apparatus 100 is realized as an MFP (Multifunction Product) that includes an image reading function, a copying function and a facsimile sending/receiving function. While the image processing apparatus 100 is described as an MFP in this embodiment, it may instead be realized in the form of an ordinary computer that can perform resolution conversion and compression processing to input image data.

The image reader 102 includes a photoelectric conversion element such as a CCD (Charge Coupled Device), an analog processor and an A/D converter. RGB analog signals are output from the CCD. The analog processor performs clamp adjustment and gain adjustment to the RGB analog signals output from the CCD and outputs the adjusted signals to the A/D converter. The A/D converter converts the RGB analog signals into 8-bit digital signals. These 8-bit digital signals comprise image data. In addition, the image reader 102 includes a shading correction unit, a line distance correction unit, an area determination unit and an MTF (Modulation Transfer Function) correction unit. The shading correction unit executes processing of the image data output from the A/D converter to correct for fluctuations in shading in the main scanning direction caused by, for example, unevenness in the illumination that is irradiated onto the original document from a light source when the original document is scanned. The CCD comprises a photodiode array comprising R (red), G (green) and B (blue) photodiodes disposed at prescribed distances from one another. The line distance correction unit corrects for the offset in the signals caused by the distances between the photodiodes by temporarily storing in memory values corresponding to the signals output by the various color photodiodes, and delaying them for a prescribed period of time. An area determination unit determines areas in the image data that are letter/character areas, halftone areas, photo areas and the like. The determination results are output to the MTF correction unit. The MTF correction unit executes edge enhancement, smoothing, and other area-appropriate processes in accordance with the determination results input from the area determination unit, and outputs the processed image data to the image memory 104.

The image memory 104 is a random access memory (RAM) that temporarily stores image data output from the image reader 102 and image data compressed by the image processing unit 103. It also stores image data sent from an external computer and received by the network controller 107.

The operation panel 109 includes a liquid crystal touch panel, a numeric keypad and a start key to instruct the start of image reading or image copying. The liquid crystal touch panel comprises a liquid crystal display and a touch panel consisting of a transparent member placed on top of the liquid crystal display. The touch panel is an input device. The operation panel 109 displays buttons on the liquid crystal display, for example, and user operations to press displayed buttons are detected via the touch panel. This eliminates the need to have fixed switch buttons for the input device and permits input of various operations.

The panel controller 108 is controlled by the controller 101. It controls output to the display device of the operation panel 109 and receives input of user operations from the input unit of the operation panel 109.

The image processing unit 103 performs resolution conversion and compression of the image data stored in the image memory 104. The storage unit 106 is a storage device such as a hard disk.

The network controller 107 is a communication interface that connects the image processing apparatus 100 to a network and controls communications with other computers, MFPs or the like connected to the network. The network controller 107 may comprise a network interface, or a serial interface or a parallel interface that connects directly to another computer or MFP. An interface appropriate to the type of connection with the network and is used as the network controller 107. For the network, a local area network (LAN), the Internet, public telephone lines or the like may be used, and the circuit can be either a landline or wireless circuit.

The image processing apparatus 100 of this embodiment reads an original document via the image reader 102 based on user operation from the operation panel 109. When an operation is performed, image data output from the image reader 102 is stored in the image memory 104. In addition, image data sent from an external computer, MFP or the like is stored in the image memory 104 by the network controller 107. The image data stored in the image memory 104 via user operation from the operation panel 109 undergoes resolution conversion by the image processing unit 103, and the resolution-converted image data is compressed and stored in the storage unit 106. Alternatively, the compressed image data is sent to a computer, MFP or other apparatus.

Figure 2:
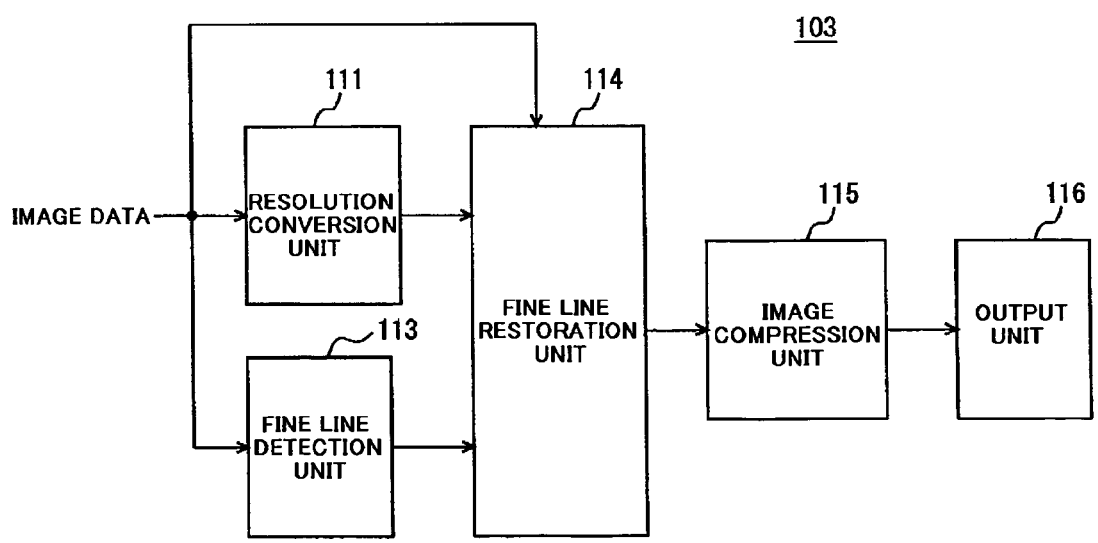
FIG. 2 is a function block diagram showing the basic functions of the image processing unit of the image processing apparatus of the first embodiment.

FIG. 2 is a function block diagram showing the basic functions of the image processing unit of the image processing apparatus of a first embodiment. With reference to FIG. 2, the image processing unit 103 includes a resolution conversion unit 111 that reads the image data stored in the image memory 104 and converts it to a prescribed resolution, a fine line detection unit 113 that detects fine lines from the image data, a fine line restoration unit 114 that restores the fine lines in the image data that has undergone resolution conversion by the resolution conversion unit 111 (hereinafter described as 'resolution-converted images'), an image compression unit 115 that compresses resolution-converted images that have had fine lines restored, and an output unit 116 that outputs compressed resolution-converted images (hereinafter 'compressed images') to the storage unit 106 or the network controller 107.

The resolution conversion unit 111 converts image data read from the image memory 104 into the resolution output by the panel controller 108 (hereinafter the 'specified resolution'). In other words, the desired resolution can be specified by the user via an operation using the operation panel 109. Furthermore, the target resolution need not be specified by the user, and a preset resolution may be used. The preset resolution may be set by default, or may be sought from the resolution of the image data or based on the attributes of the image data. The attributes of the image data are established based on whether the image data includes, for example, areas in which a photo appears, areas in which characters appear, or areas in which graphics or drawings appear. Alternatively, the resolution may be changed in accordance with the form in which the image data is to be sent (for example, if the image data is to be sent via facsimile over a telephone lines, the resolution may be changed to the 200 dpi standard resolution for a fax document, or more precisely, according to the applicable facsimile standard).

The fine line detection unit 113 detects fine lines from the image data read from the image memory 104. The resolution output by the panel controller 108 is input to the fine line detection unit 113. The fine line detection unit 113 detects from the image data fine lines having a thickness appropriate to the input resolution.

The resolution-converted image is input to the fine line restoration unit 114 from the resolution conversion unit 111 and information regarding fine lines is also input thereto from the fine line detection unit 113. The fine line restoration unit 114 detects those fine lines in the resolution-converted image in which gaps, i.e., discontinuations, appear in the fine lines. It then corrects the pixel values for the detected gaps, thereby restoring the fine lines.

The resolution-converted image in which the fine lines have been restored is input to the image compression unit 115. The image compression unit 115 compresses the input resolution-converted image using a compressed format input from the panel controller 108. It is also acceptable if the compression format is not input by the user, but is rather a preset compression format. The image compression unit 115 outputs the compressed resolution-converted image data to the output unit 116, as well as to the storage unit 106.

The compressed data is input from the image compression unit 115 to the output unit 116. The output unit 116 sends the compressed data to another apparatus from the network controller 107 over the network. The recipient may be input directly by the user from the operation panel 109, or the network address of the recipient may be preset in the storage unit 106 and read out therefrom. This network address may comprise, for example, an e-mail address, an IP (Internet Protocol) address, a MAC (Media Access Control) address or the like.

The resolution conversion process executed by the resolution conversion unit 111 will now be described with reference to FIGS. 3 through 5. Here, for purposes of explanation, the conversion process will reduce the resolution in both the horizontal and vertical directions by one-half. In the case of a resolution conversion process that reduces the resolution, the resolution conversion unit 111 deems the average of adjacent pixels the post-resolution conversion process pixel value. This conversion process maintains the tone characteristic of the image. In the description below, lines having a thickness of no more than two pixels of image data are deemed fine lines.

Figure 3:
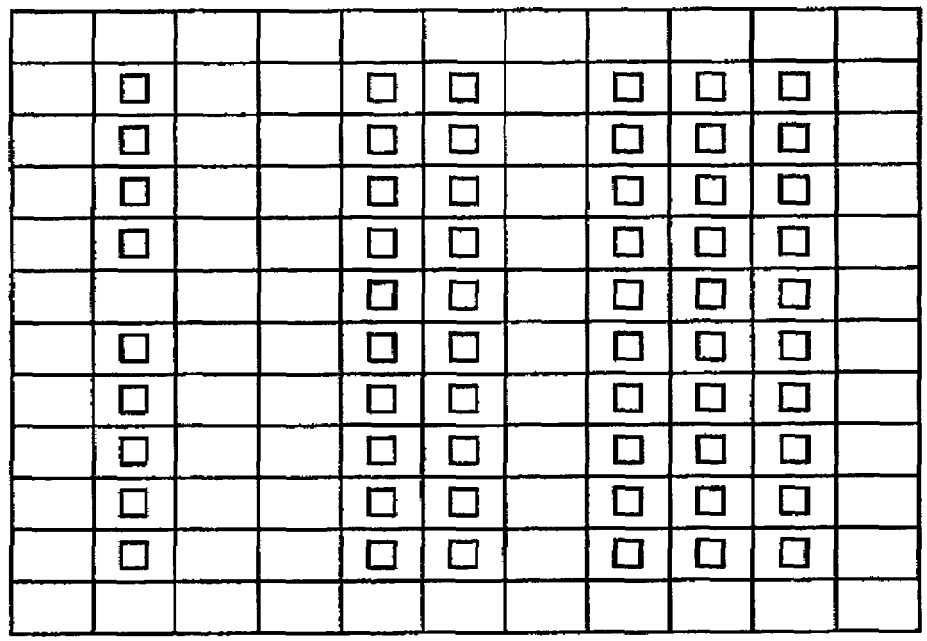
FIG. 3 shows an example of image data.

FIG. 3 shows an example of image data. FIG. 3(A) shows the image data as an arrangement of pixel values, and FIG. 3(B) is a visual representation of the same data.

In FIGS. 3(B), 4(B) and 5(B) pixels having a pixel value of 70 or less are indicated by a blank space, pixels having a pixel value from 71 to 100 are indicated by a triangle, pixels having a pixel value from 101 to 180 are indicated by a circle, and pixels having a pixel value that exceeds 180 are indicated by a square. When pixels having a pixel value of 70 or less are displayed or printed, it is difficult for the human eye to perceive the pixel. Therefore, in FIGS. 3(B), 4(B) and 5(B), pixels indicated by a blank space cannot be perceived by the human eye.

FIG. 4 shows a main scanning direction-reduced converted image wherein the number of pixels in the image data is reduced by half in the main scanning direction (the horizontal direction in the drawing). FIG. 4(A) shows the main scanning direction-reduced converted image as an arrangement of pixel values, and, FIG. 4(B) is a visual representation of the same image. A main scanning direction-reduced converted image is an image resulting from a process in which the average of the pixel values for two adjacent pixels in the main scanning direction of the image data is assigned to one pixel of the main scanning direction-reduced converted image. The average of the pixel values of the pixel in the leftmost first column in the image data shown in FIG. 3(A) and the adjacent pixel to its right in the same row is assigned as the pixel value for the pixel in the leftmost first column in that row of the main scanning direction-reduced converted image shown in FIG. 4(A). Similarly, the average of the pixel values of the pixels represented by the third and fourth columns in the same row of the image data is assigned as the pixel value for the pixel in the second column in that row of the main scanning direction-reduced converted image, the average of the pixel values of the pixels represented by the fifth and sixth columns in the same row of the image data is assigned as the pixel value for the pixel in the third column in that row of the main scanning direction-reduced converted image, the average of the pixel values of the pixels represented by the seventh and eighth columns in the same row of the image data is assigned as the pixel value for the pixel in the fourth column in that row of the main scanning direction-reduced converted image, and the average of the pixel values of the pixels represented by the ninth and tenth columns in the same row of the image data is assigned as the pixel value for the pixel in the fifth column in that row of the main scanning direction-reduced converted image. The pixel values in the eleventh column of the image data are assigned as the pixel values of the pixels in the sixth column of the main scanning direction-reduced converted image.

As is clearly seen from FIGS. 4(A) and 4(B), because the pixel values adjacent to the fine lines in the image data are low, the pixel values of the pixels forming the fine lines in the main scanning direction-reduced converted image become low as well.

Figures 5, 6:
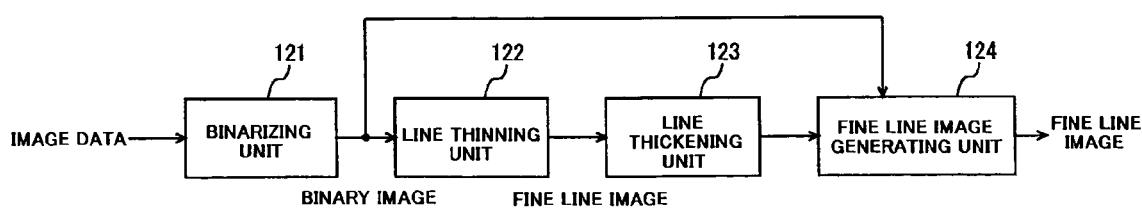
FIG. 5 shows a resolution-converted image wherein the number of pixels in the main scanning direction-reduced converted image has been reduced by half in the secondary scanning direction (the vertical direction in the drawing)
FIG. 6 is a function block diagram showing the functions of the fine line detection unit in detail.

FIG. 5 shows a resolution-converted image in which the number of pixels in the main scanning direction-reduced converted image is reduced by half in the secondary scanning direction (the vertical direction in the drawing). FIG. 5(A) shows the resolution-converted image as an arrangement of pixel values, while FIG. 5(B) is a visual representation of the same image. A resolution-converted image is an image resulting from a process in which the average of the pixel values for two adjacent pixels of the main scanning direction-reduced converted image in the secondary scanning direction is assigned to one pixel of the resolution-converted image. The average of the pixel values of the pixel in the topmost first row in the image data shown in FIG. 4(A) and the adjacent pixel below it in the same column is assigned as the pixel value for the pixel in the topmost first row in that column for the resolution-converted image shown in FIG. 5(A). Similarly, the average of the pixel values of the pixels represented by the third and fourth rows in the same column is assigned as the pixel value for the pixel in the second row in that column of the resolution-converted image, the average of the pixel values of the pixels represented by the fifth and sixth rows in the same column is assigned as the pixel value for the pixel in the third row in that column of the resolution-converted image, the average of the pixel values of the pixels represented by the seventh and eighth rows in the same column is assigned as the pixel value for the pixel in the fourth row in that column of the resolution-converted image, the average of the pixel values of the pixels represented by the ninth and tenth rows in the same column is assigned as the pixel value for the pixel in the fifth row in that column of the resolution-converted image, and the average of the pixel values of the pixels represented by the eleventh and twelfth rows in the same column is assigned as the pixel value for the pixel in the sixth row in that column of the resolution-converted image.

Here, a resolution conversion process in which the resolution is reduced in half is described, but the conversion can be carried out in a similar fashion when the resolution is converted to a resolution other than one-half of the original resolution.

FIG. 6 is a function block diagram showing the functions of the fine line detection unit 113 in detail. With reference to FIG. 6, the fine line detection unit 113 includes a binarization unit 121 that generates a binarized image by binarizing image data, a line thinning unit 122 that generates a line-thinned image by thinning the lines in the binarized image, a line thickening unit 123 that generates a line-thickened image by thickening the lines in the line-thinned image, and a fine line image generating unit 124 that generates from the binarized image and the line-thickened image a fine line image showing the positions of the fine lines.

The binarization unit 121 compares the pixel values of the image data with a prescribed threshold value and deems pixel values smaller than the threshold value to be '0' and those larger than the threshold value to be '1'.

The line thinning unit 122 sequentially scans the pixels of the binarized image and generates a line-thinned image based on a filtering process using a line thinning filter.

The line thickening unit 123 sequentially scans the line-thinned image and generates a line-thickened image based on a filtering process using a line thickening filter.

The fine line image generating unit 124 generates a fine line image comprising the difference between the binarized image and the line-thickened image.

FIG. 7 shows an example of the line thinning filter used by the line thinning unit 122. This line thinning filter is a maximizing filter comprising a 3×3 matrix. The central pixel V22 is the target pixel. Using this line thinning filter, the pixel value of the target pixel V22 is replaced by the higher pixel value of all of the nine pixels V11-V33 in the line thinning filter.

The line thickness of the line-thinned image generated by the line thinning unit 122 is reduced by two pixels. As a result, fine lines having a line thickness of one or two pixels are eliminated.

FIG. 8 shows an example of the line thickening filter used by the line thickening unit 123. This line thickening filter is a maximizing filter comprising a 3×3 matrix. The central pixel V22 is the target pixel. Using this line thickening filter, the pixel value of the target pixel V22 is replaced by the minimum pixel value of all of the nine pixels V11-V33 in the line thickening filter.

The line thickness of the line-thickened image generated by the line thickening unit 123 is increased by two pixels. Because the line thickening unit 123 processes line-thinned images, the line-thickened image includes only those lines in the binarized image having a thickness of at least three pixels.

A key point in this regard is that the line thinning filter and the line thickening filter are the same size. Furthermore, the sizes of the line thickening filter and the line thinning filter are established based on the thickness of the fine lines to be detected. In addition, the thickness of the fine lines to be detected is established based on the ratio of the post-conversion resolution to the pre-conversion resolution (hereinafter referred to as the 'resolution ratio'). Therefore, the sizes of the line thickening and line thinning filters are established by the target resolution.

Where the resolution is to be reduced by half in both the horizontal and vertical directions via resolution conversion as described above, the pixels in one row or one column are thinned. As a result, fine lines having a thickness of one or two pixels are highly likely to exhibit gaps after resolution conversion. Therefore, it is sufficient if fine lines having a line thickness of approximately two pixels are detected, and accordingly, the line thickening filter and the line thinning filter have a size of three rows by three columns.

Where the resolution conversion process reduces the resolution to one-third of the original resolution both horizontally and vertically, fine lines having a thickness of two or three pixels are highly likely to exhibit gaps after resolution conversion. Therefore, it is sufficient if fine lines having a line thickness of approximately three pixels are detected, and accordingly, the line thickening filter and the line thinning filter have a size of three rows by three columns.

In other words, where the resolution is reduced via the resolution conversion process to a resolution of 1/N in both the horizontal and vertical directions (i.e., the post-conversion resolution divided by the pre-conversion resolution, where the post-conversion resolution is deemed '1' and the pre-conversion resolution is expressed as 'N'), it is sufficient if fine lines having an approximate thickness of N pixels are detected, and where N is an even number, it is preferred that the line thickening filter and the line thinning filter have a size of (N+1) rows by (N+1) columns, while where N is an odd number, it is preferred that the filters have a size of N rows by N columns.

As seen from the above discussion, the thickness of the fine lines to be detected from the pre-resolution conversion image data is established from the resolution of the image data before and after resolution conversion. By using filters that correspond to the resolution of the image data before and after resolution conversion, the thickness of the fine lines that are detected in accordance with the resolution of the image data before and after resolution conversion can be changed.

Figure 10:
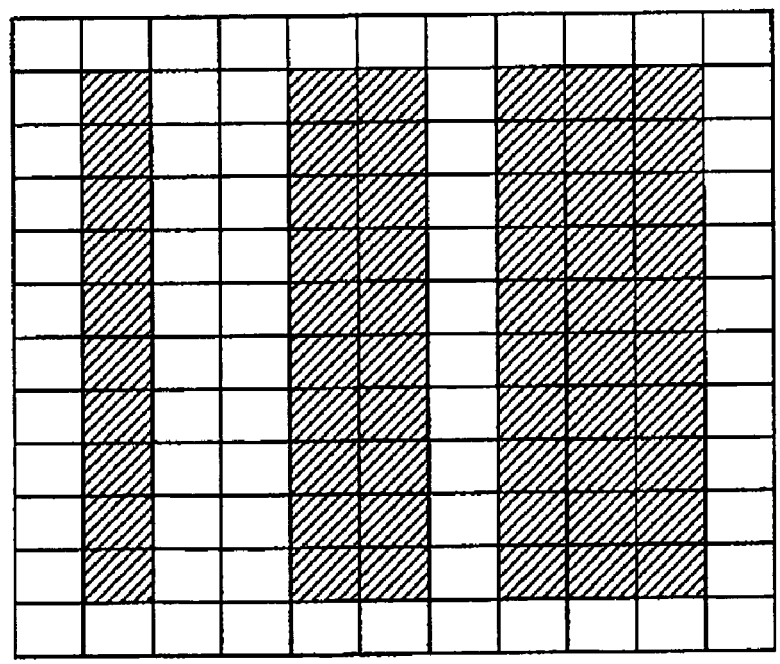
FIG. 10 shows a binarized image.

The process executed by the fine line detection unit 113 will now be explained with reference to FIGS. 9 through 13. FIG. 9 shows image data as an arrangement of pixel values. FIG. 10 shows a binarized image generated by the binarization unit 121. FIG. 10(A) shows the binarized image as an arrangement of pixel values, while FIG. 10(B) is the visual representation of the same image.

Figure 11:
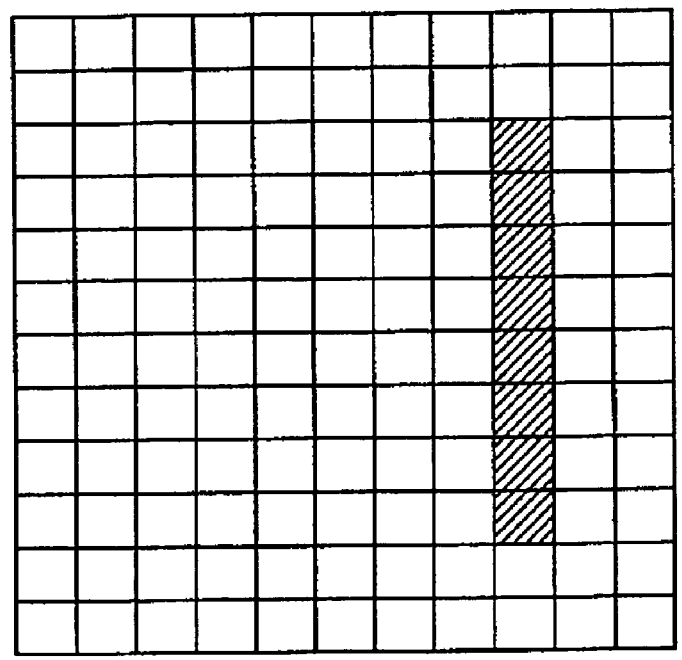
FIG. 11 shows a line-thinned image.

FIG. 11 shows a line-thinned image. FIG. 11(A) shows the line-thinned image as an arrangement of pixel values, while FIG. 11(B) is the visual representation of the same image. The line-thinned image is an image obtained by line-thinning the binary data using the line thinning unit 122. Referring to FIG. 11, the fine lines in the binarized image that have a thickness not exceeding two pixels are eliminated, and only those lines that have a thickness of three pixels from the outset remain therein.

Figure 12:
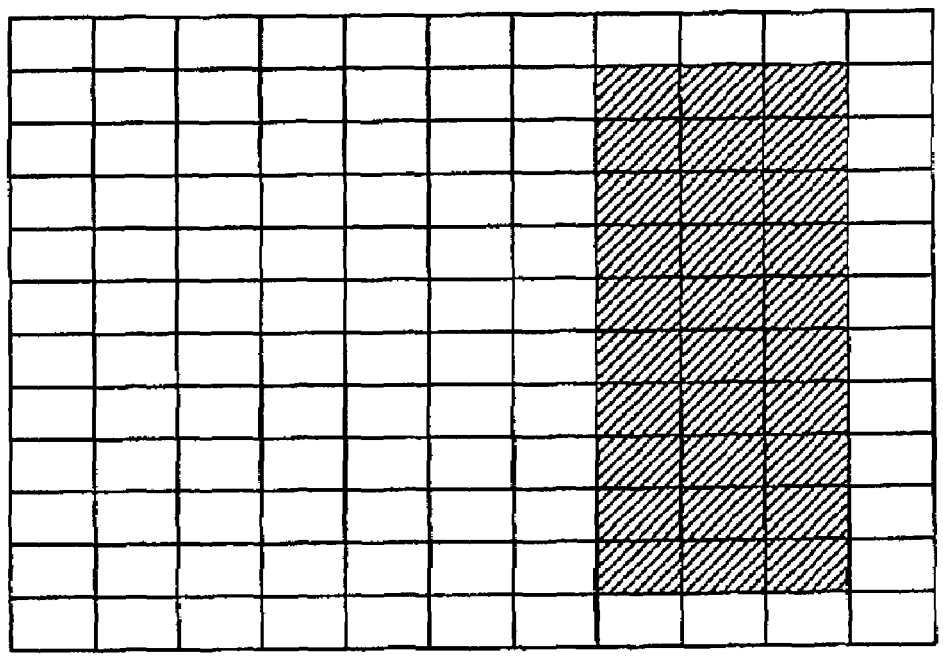
FIG. 12 shows a line-thickened image.

FIG. 12 shows a line-thickened image. FIG. 12(A) shows the line-thickened image as an arrangement of pixel values, while FIG. 12(B) is the visual representation of the same image. The line-thickened image is an image obtained by line-thickening the line-thinned image using the line-thickening unit 123. Referring to FIG. 12, the fine lines in the binarized image that have a thickness not exceeding two pixels are eliminated, and only those lines that have a thickness of three pixels from the outset remain therein.

When a line-thinned image is generated from the binary data resulting from binarization of the image data and a line-thickened image is generated from this line-thinned image as described above, the line-thickened image comprises an image in which fine lines are eliminated from the binarized data.

Figure 13:
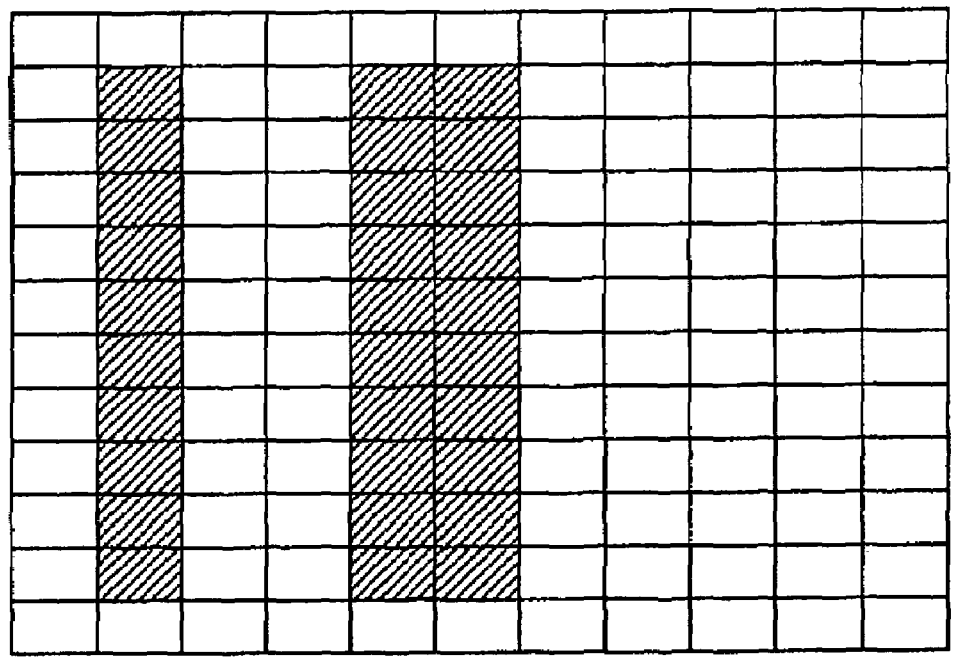
FIG. 13 shows a fine line image.

FIG. 13 shows a fine line image. FIG. 13(A) shows the fine line image as an arrangement of pixel values, while FIG. 13(B) is the visual representation of the same image. The fine line image is sought from the difference between the binarized image and the line-thickened image. Referring to FIG. 13, the fine line image includes only those lines in the binarized image that have a thickness not exceeding two pixels.

A fine line image indicating the positions of fine lines that do not have the desired thickness in the image data is generated by the fine line detection unit 113 as described above.

Figure 14:
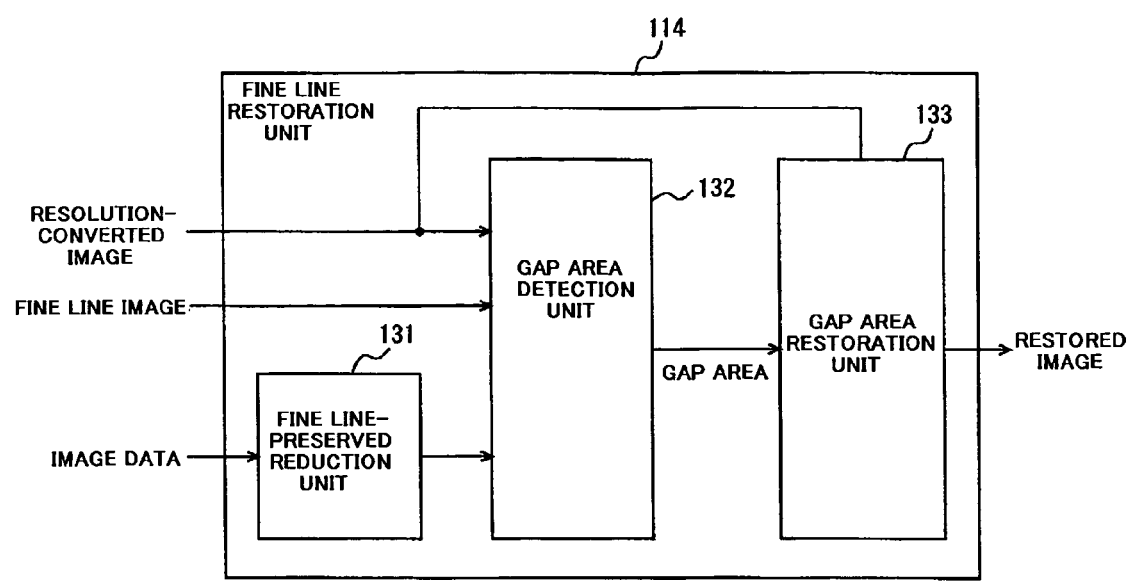
FIG. 14 is a function block diagram showing the functions of the fine line restoration unit in detail.

FIG. 14 is a function block diagram showing the functions of the fine line restoration unit in detail. Referring to FIG. 14, image data from the image memory, a resolution-converted image from the resolution conversion unit 111, and a fine line image from the fine line detection unit 113 are input to the fine line restoration unit 114. The fine line restoration unit 114 includes a fine line-preserved reduction unit 131 that generates a reduced image by converting the resolution of the input image data using the fine line preservation method, a gap detection unit 132 that detects gaps in fine lines from the input resolution-converted image, and a gap restoration unit 133 that restores the gaps in the resolution-converted image.

The fine line-preserved reduction unit 131 performs resolution conversion of the image data using a method different from that used by the resolution conversion unit 111. While the resolution conversion unit 111 deemed the average of adjacent pixels the post-resolution conversion pixel value, the fine line-preserved reduction unit 131 differs in that it deems the higher pixel value of adjacent pixels to be the post-resolution conversion pixel value. Because its construction is otherwise identical to that of the resolution conversion unit 111, it will not be described further. Because the fine line-preserved reduction unit 131 deems the higher pixel value of adjacent pixels to be the post-resolution conversion pixel value, fine lines that exist in the image data are allowed to remain in the reduced image following fine line-preserved reduction.

The gap detection unit 132 detects as gaps those pixels among the pixels of the resolution-converted image input from the resolution conversion unit 111 that belong to fine lines in the fine line image and as to which the difference between its pixel value and the pixel value of the corresponding pixel in the reduced image input from the fine line-preserved reduction unit 131 exceeds a prescribed threshold value. The gap detection unit 132 outputs the positions of the detected gaps in the resolution-converted image to the gap restoration unit 133.

A resolution-converted image is input to the gap restoration unit 133 from the resolution conversion unit 111, and the positions of the gaps in the resolution-converted image are input from the gap detection unit 132. The gap restoration unit 133 changes the pixel value of each pixel comprising a gap in the resolution-converted image to the higher pixel value of the eight surrounding pixels. As a result, because gaps are corrected based on the pixel values of the surrounding pixels, gaps in fine lines in the resolution-converted image are corrected and fine lines are restored. The restored image in which fine lines are restored by the gap restoration unit 133 is output to the image compression unit 115.

Figure 15:
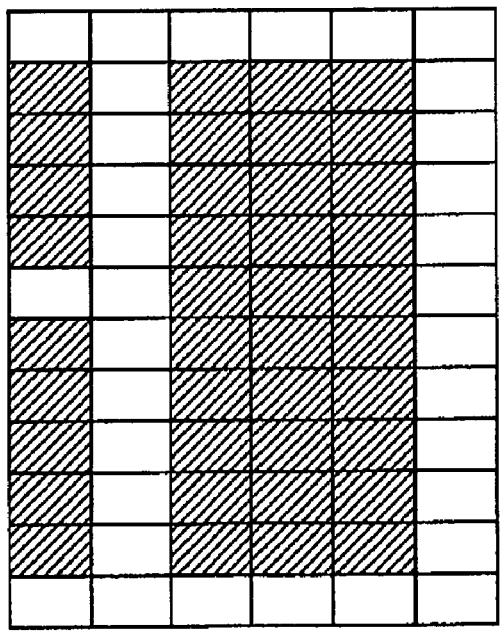
FIG. 15 shows a main-scanning direction-reduced converted image wherein the number of pixels in the image data has been reduced by half in the main scanning direction (the horizontal direction in the drawing) via fine line-preserved reduction conversion.

The reduction process executed by the fine line-preserved reduction unit 131 will be explained in detail below with reference to FIGS. 15-17. FIG. 15 shows a main scanning direction-reduced converted image in which the number of pixels in the image data is reduced by half in the main scanning direction (the horizontal direction in the drawing) via fine line-preserved reduction conversion. FIG. 15(A) shows the main scanning direction-reduced converted image that has undergone fine line-preserved reduction conversion as an arrangement of pixel values, while FIG. 15(B) is the visual representation of the same image. The fine line-preserved reduction conversion process is a process whereby the higher pixel value of two adjacent pixels in the image data along the main scanning direction is assigned to a pixel in the main scanning direction-reduced converted image. The higher pixel value between the first pixel in the leftmost column in the image data shown in FIG. 3(A) and the pixel adjacent thereto in the second column to the right in the same row is assigned as the pixel value for the pixel in the first column, i.e., the leftmost pixel, in that row in the main scanning direction-reduced converted image. Similarly, the higher pixel value among the two pixels in the third and fourth columns in the same row is assigned as the pixel value for the pixel in the second column in that row in the main scanning-direction-reduced converted image, the higher pixel-value among the two pixels in the fifth and sixth columns in the same row is assigned as the pixel value for the pixel in the third column in that row in the main scanning direction-reduced converted image, the higher pixel value among the two pixels in the seventh and eighth columns in the same row is assigned as the pixel value for the pixel in the fourth column in that row in the main scanning direction-reduced image, and the higher pixel value among the two pixels in the ninth and tenth columns in the same row is assigned as the pixel value for the pixel in the fifth column in that row in the main scanning direction-reduced converted image. The pixel value of the pixel in the eleventh column of the image data is assigned as the pixel value for the pixel in the sixth column in that row in the main scanning direction-reduced converted image.

As is clear from FIGS. 15(A) and 15(B), although the pixel values adjacent to each fine line in the image data are low, the pixel value of each pixel forming each fine line in the main scanning direction-reduced image is the higher of the two pixel values used for the reduction processing.

Figure 16:
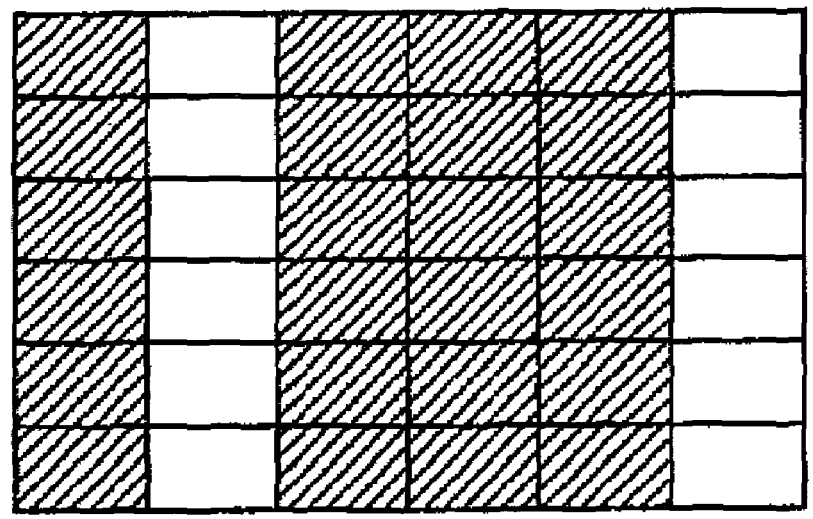
FIG. 16 shows a resolution-converted image wherein the number of pixels in the main scanning direction-reduced converted image shown in FIG. 15 has been reduced by half in the secondary scanning direction (the vertical direction in the drawing) via fine line-preserved reduction conversion.

FIG. 16 shows a resolution-converted image wherein the number of pixels in the main-scanning direction-reduced converted image shown in FIG. 15 has been reduced by half in the secondary scanning direction (the vertical direction in the drawing) via fine line-preserved reduction conversion. FIG. 16(A) shows the resolution-converted image that has undergone fine line-preserved reduction as an arrangement of pixel values, while FIG. 16(B) is a visual representation of the same image. The resolution-converted image that has undergone fine line-preserved reduction conversion is an image obtained as a result of a process in which the higher pixel value of two adjacent pixels of the main scanning direction-reduced converted image along the secondary scanning direction are assigned as the pixel values for the resolution-converted image. The higher pixel value between the pixel in the topmost first row in the image data shown in FIG. 15(A) and the adjacent pixel below it in the same column is assigned as the pixel value for the pixel in the topmost first row in that column of the resolution-converted image shown in FIG. 16(A). Similarly, the higher pixel value between the pixel values of the pixels represented by the third and fourth rows in the same column is assigned as the pixel value for the pixel in the second row in that column of the resolution-converted image, the higher pixel value between the pixel values of the pixels represented by the fifth and sixth rows in the same column is assigned as the pixel value for the pixel in the third row in that column of the resolution-converted image, the higher pixel value between the pixel values of the pixels represented by the seventh and eighth rows in the same column is assigned as the pixel value for the pixel in the fourth row in that column of the resolution-converted image, the higher pixel value between the pixel values of the pixels represented by the ninth and tenth rows in the same column is assigned as the pixel value for the pixel in the fifth row in that column of the resolution-converted image, and the higher pixel value between the pixel values of the pixels represented by the eleventh and twelfth rows in the same column is assigned as the pixel value for the pixel in the sixth row in that column of the resolution-converted image.

Here, a resolution conversion process involving fine line-preserved reduction conversion in which the resolution is reduced by one-half was described, but conversion to a different resolution may be performed in the same manner.

Figure 17:
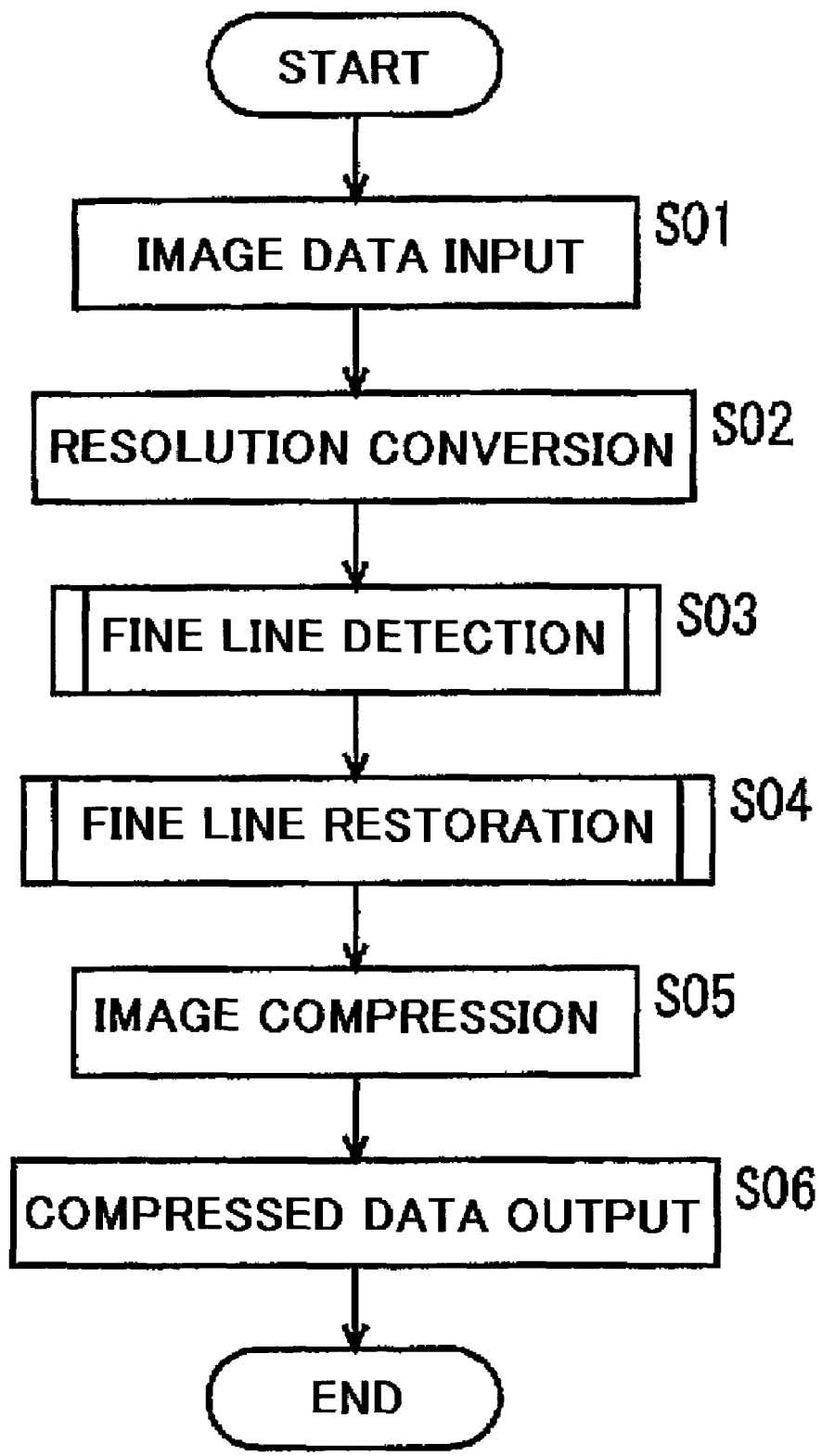
FIG. 17 is a flow chart showing the sequence of operations executed by the image processing apparatus of a first embodiment.

FIG. 17 is a flow chart showing the sequence of operations executed by the image processing apparatus of this embodiment. Referring to FIG. 17, image data is input to the image processing apparatus 100 (step S01). The image data is stored in the image memory 104 via reading of an original document by the image reader 102 or receipt of the image data from a different computer or MFP connected over a network. The image data stored in this image memory 104 is read out.

The read image data is then converted to a user-specified or preset resolution (hereinafter referred to as the 'specified resolution') (step S02). The resolution conversion performed in this operation is executed by the resolution conversion unit 111. In other words, resolution conversion that maintains the tone characteristic of the image is executed. A resolution-converted image is generated in this fashion.

Next, fine lines are detected from the image data read from the image memory 104 (step S03). The thickness of the fine lines detected here is established in accordance with the resolution to which the image data was converted in step S02.

Fine lines are then restored by correcting the pixel values of the pixels in the resolution-converted image generated in step S02 that belong to the fine lines detected in step S03 and the pixels that belong to gaps in fine lines (step S04). The resolution-converted image that underwent fine line restoration is then compressed using a user-specified compression method (step S05). It is also acceptable if the compression method is set in advance rather than specified by the user. The compressed image data is then sent to another apparatus over a network (step S06). The recipient may be input directly by the user from the operation panel 109 or set in advance.

Because the image data is compressed and stored or sent after its resolution is reduced in the image processing apparatus 100 of this embodiment, the storage area or amount of data to be sent can be reduced.

Figure 18:
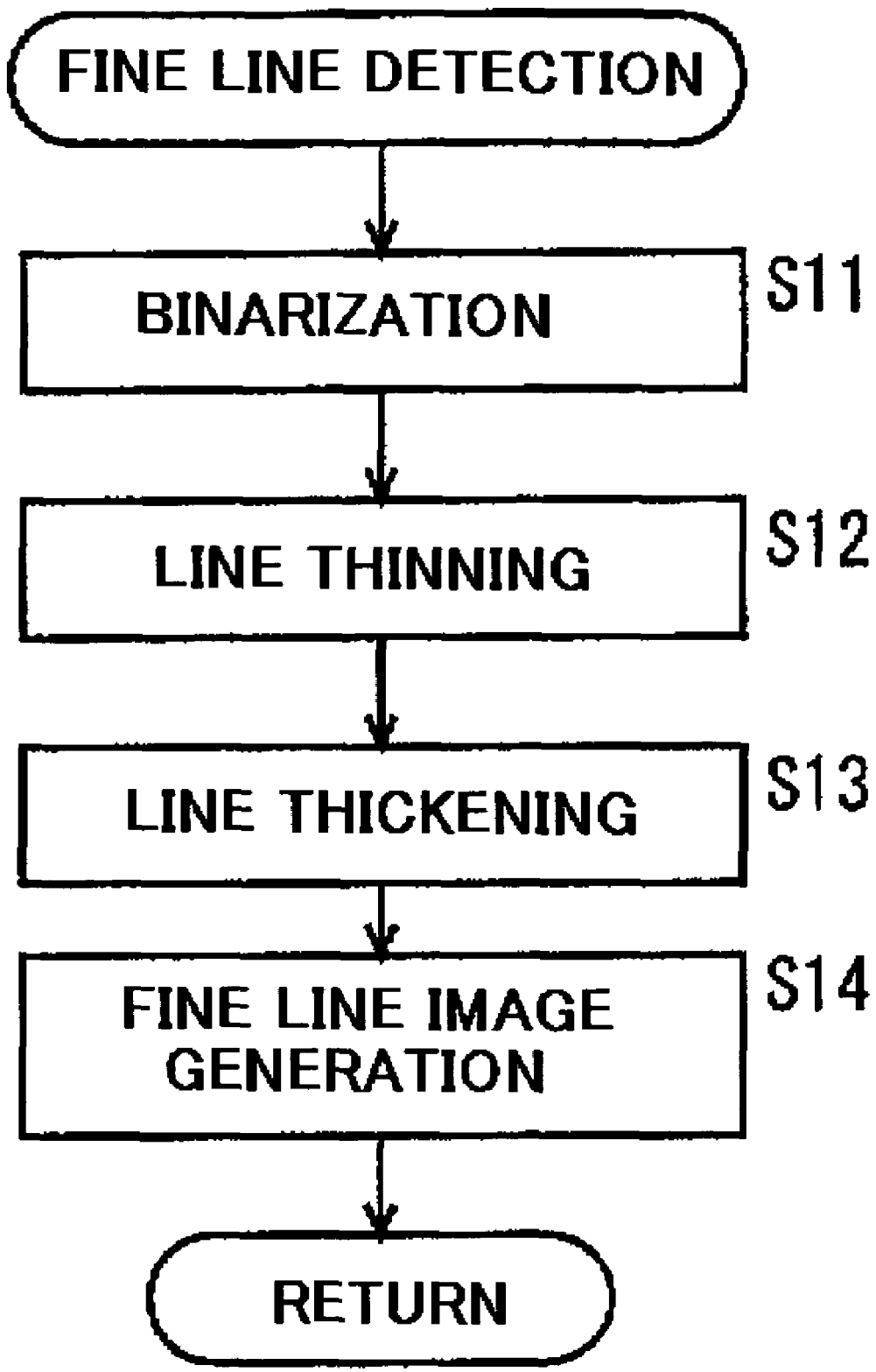
FIG. 18 is a flow chart showing the sequence of operations of the fine line detection process executed in step S03 in FIG. 17.

FIG. 18 is a flow chart showing the sequence of operations of the fine line detection process executed in step S03 shown in FIG. 17. Referring to FIG. 18, the image processing apparatus 100 generates a binarized image by binarizing image data (step S11).

The pixels of the binarized image are then sequentially scanned and a line-thinned image is generated by line-thinning the binarized image using a line thinning filter (step S12). Here, because a three row by three column line thinning filter is used, lines in the binarized image are thinned by two pixels. As a result, fine lines having a thickness of one or two pixels are eliminated.

Furthermore, the pixels of the line-thinned image are sequentially scanned and a line-thickened image is generated by subjecting the line-thinned image to line thickening using a line thickening filter having the same size as the line thinning filter described above (step S13). Here, because a three row by three column line thickening filter is used, the lines in the fine line image increase in thickness by two pixels. As a result, the line-thickened image includes only lines that have a minimum thickness of three pixels in the binarized image. In addition, the sizes of the line thickening filter and the line thinning filter are established by the resolution ratio. This is because the thickness of the fine lines in which gaps are created by the resolution conversion process is determined by the resolution prior to conversion via the resolution conversion process and the resolution after such conversion.

When a line-thinned image is generated from the binarized data resulting from binarization of the image data and a line-thickened image is generated from the resulting fine line image, the line-thickened image comprises an image that results after fine lines have been eliminated from the binarized data.

A fine line image comprising the difference between the binarized image and the line-thickened image is then generated (step S14). As a result, a fine line image indicating the positions in the image data of fine lines that do not meet the prescribed thickness is generated.

Figure 19:
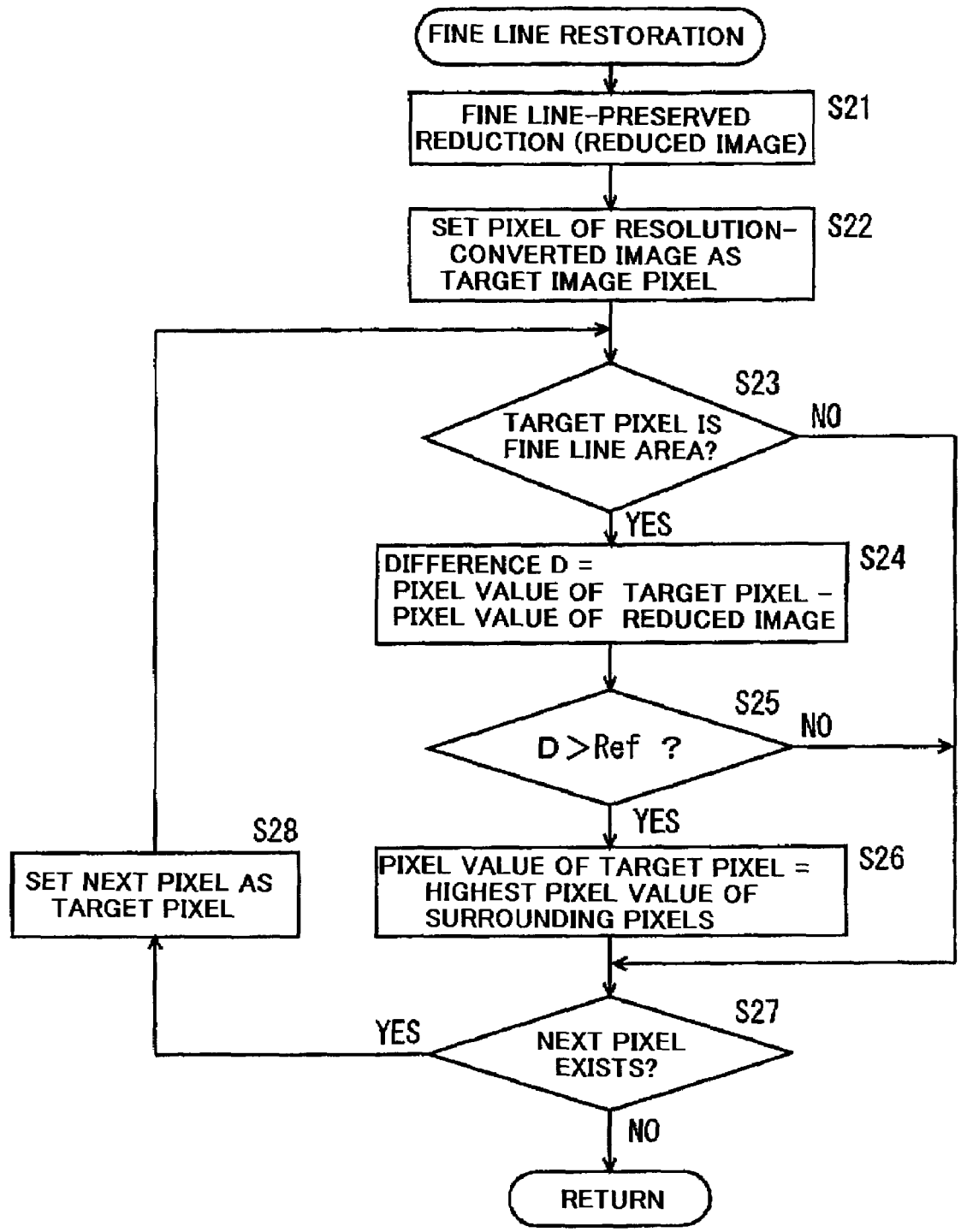
FIG. 19 is a flow chart showing the sequence of operations of the fine line restoration process executed in step S04 in FIG. 17.

FIG. 19 is a flow chart showing the sequence of operations of the fine line restoration process executed in step S04 shown in FIG. 17. The image processing apparatus 100 generates a reduced image by converting the resolution of the image data using the fine line preservation method (step S21). In order to sequentially scan the pixels of the resolution-converted image, the pixels included in the resolution-converted image are designated as target pixels (step S22).

It is then determined whether or not a target pixel belongs to a fine line (step S23). If it belongs to a fine line, the image processing apparatus 100 proceeds to step S24, while if the target pixel does not belong to a fine line, the image processing apparatus 100 advances to step S27. The determination of whether or not a target pixel belongs to a fine line is made based on the fine line image generated in step S03 shown in FIG. 17. While the sizes of the fine line image and the difference image are different, an image resulting from subjecting the fine line image to fine line-preserved reduction may be used, for example.

In step S24, the difference D between the pixel value of the target pixel and the pixel value of the corresponding pixel in the reduced image is calculated. It is then determined whether or not this difference D exceeds a prescribed threshold value Ref (step S25). If the difference D exceeds the threshold value Ref, the image processing apparatus 100 proceeds to step S26, but if not, the image processing apparatus 100 advances to step S27. If the difference D exceeds the threshold value Ref, the pixel is determined to constitute a gap in a fine line in the resolution-converted image.

In step S26, the pixel value of the target pixel is replaced by the higher pixel value of the pixels surrounding the target pixel. As a result, the gap is corrected and the fine line is restored. Because the pixel value of a pixel constituting a gap is replaced by the higher pixel value of the surrounding pixels, no pixel value deviates drastically from the pixel values of the surrounding pixels. Consequently, the appearance of filled gaps that are conspicuously different in appearance than the surrounding area can be prevented.

In step S27, it is determined whether or not pixels exist in the resolution-converted image that have not been designated as a target pixel. If pixels that need to be designated as a target pixel still exist, the image processing apparatus 100 proceeds to step S28, while if no such pixels exist, the process ends. In step S28, a pixel that needs to be designated as a target pixel is designated as the next target pixel, whereupon the image processing apparatus 100 proceeds to step S23.

<Variation of Fine Line Restoration Unit>

Figure 20:
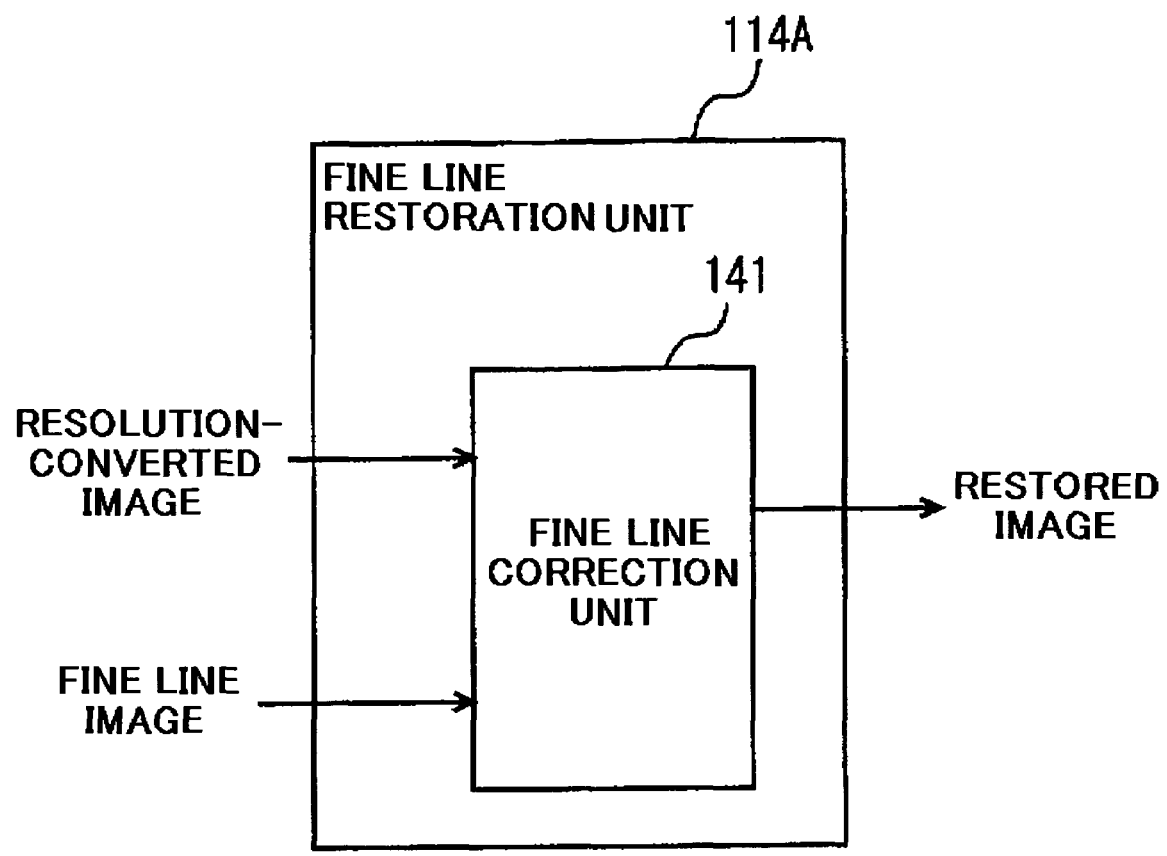
FIG. 20 is a function block diagram showing the functions of a modified fine line restoration unit.

A variation of the fine line restoration unit 114 will now be described. FIG. 20 is a function block diagram showing the functions of a modified fine line restoration unit. Referring to FIG. 20, a resolution-converted image from the resolution conversion unit 111 and a fine line image from the fine line detection unit 113 are input to the modified fine line restoration unit 114A. The modified fine line restoration unit 114A includes a fine line correction unit 141. The fine line correction unit 141 compares with a prescribed threshold value Ref2 the pixel value of each pixel in fine lines in the resolution-converted image that are specified based on the fine line image. If the pixel value of a fine line pixel does not equal or exceed the threshold value Ref2, the pixel value of the fine line pixel is replaced by the higher pixel value of the surrounding pixels.

If the pixel value of a fine line pixel does not equal or exceed the threshold value Ref2, the modified fine line restoration unit 114A determines that the fine line pixel is a gap, as described above. Furthermore, by replacing the pixel value of a pixel determined to be a gap with the higher pixel value of the surrounding pixels, fine lines are restored. It is acceptable if the pixel value is replaced with a pixel value that is consistent with the pixel values of the surrounding pixels, rather than with the higher pixel value of the surrounding pixels. For example, the average value of the surrounding pixels having a value that equals or exceeds a prescribed value, or the median value of such pixels, may be used.

Figure 21:
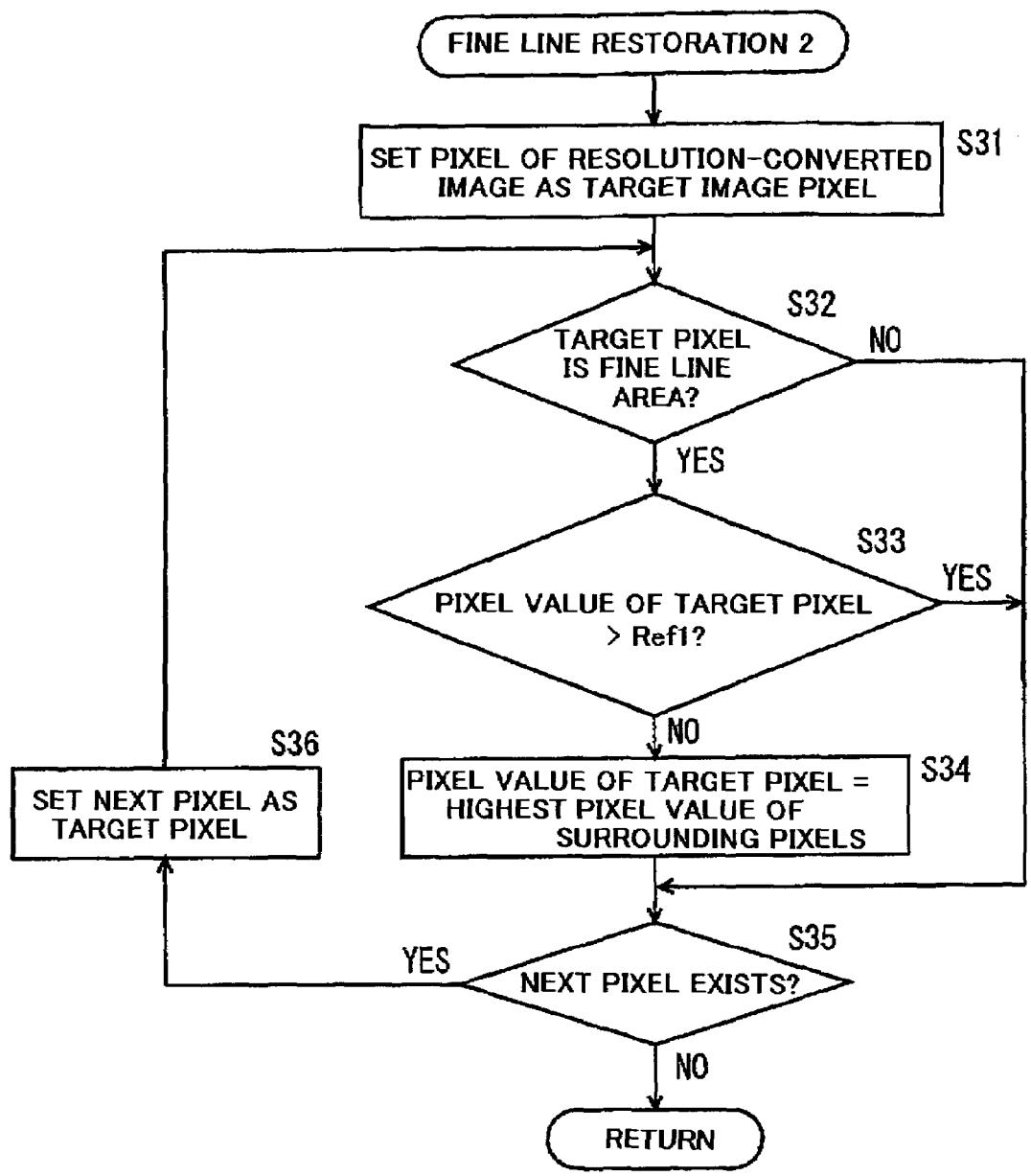
FIG. 21 is a flow chart showing the sequence of operations executed by an image processing apparatus having the modified fine line restoration unit.

FIG. 21 is a flow chart showing the sequence of operations executed by an image processing apparatus having the modified fine line restoration unit 114A. This process is equivalent to the process executed in step S04 in FIG. 17. Referring to FIG. 21, first, in order to sequentially scan the pixels of the resolution-converted image, the pixels included in the resolution-converted image are designated as target pixels (step S31).

It is then determined whether or not a target pixel belongs to a fine line (step S32). If the target pixel is determined to belong to a fine line, the image processing apparatus 100 proceeds to step S33, while if the target pixel is determined not to belong to a fine line, the image processing apparatus 100 advances to step S35. The determination of whether or not a target pixel belongs to a fine line is made based on the fine line image generated in step S03 shown in FIG. 17. While the fine line image and the resolution-converted image are of different sizes, an image resulting from subjecting the fine line image to fine line-preserved reduction may be used, for example. Alternatively, an image resulting from subjecting the fine line image to normal resolution conversion may be used.

In step S33, it is determined whether or not the pixel value of the target pixel exceeds a prescribed threshold value Ref1 (step S25). If the pixel value of the target pixel exceeds the threshold value Ref1, the image processing apparatus 100 advances to step S35, but if not, the image processing apparatus 100 proceeds to step S34. If the pixel value of the target pixel exceeds the threshold value Ref1, the pixel is determined to constitute a gap in a fine line in the resolution-converted image.

In step S34, the pixel value of the target pixel is replaced by the higher pixel value of the pixels surrounding the target pixel. As a result, the gap is corrected and the fine line is restored.

In step S35, it is determined whether or not pixels exist in the resolution-converted image that have not been designated as a target pixel. If pixels that need to be designated as a target pixel still exist, the image processing apparatus 100 proceeds to step S36, while if no such pixels exist, the process ends. In step S36, a pixel that needs to be designated as a target pixel is designated as the next target pixel, whereupon the image processing apparatus 100 proceeds to step S32.

Using the image processing apparatus 100 of this embodiment, fine lines are detected from the image data and are restored in the resolution-converted image created by conversion of the image data to a prescribed resolution as described above. Consequently, when the image data undergoes resolution conversion, the appearance of gaps in fine lines can be prevented.

Moreover, because the fine line restoration unit 114 detects gaps in fine lines from the resolution-converted image and restores only the gaps, there is no effect on areas of the resolution-converted image other than fine lines. As a result, problems such as illegibility of broken characters or lines or a decline in photo image quality can be prevented.

Furthermore, because the thickness of restored fine lines is determined in accordance with the resolution ratio, unnecessary restoration of lines in the resolution-converted image and a consequent deterioration of image quality can be prevented.

Second Embodiment

An image processing apparatus of a second embodiment will now be described. In the image processing apparatus 100 of the first embodiment, gaps in fine lines in the resolution-converted image data were corrected. By contrast, the image processing apparatus 100A of the second embodiment corrects fine lines in the image data prior to resolution conversion.

The basic overall construction of the image processing apparatus of the second embodiment is identical to that of the first embodiment shown in FIG. 1. The only difference relates to the construction of the image processing unit 103.

Figure 22:
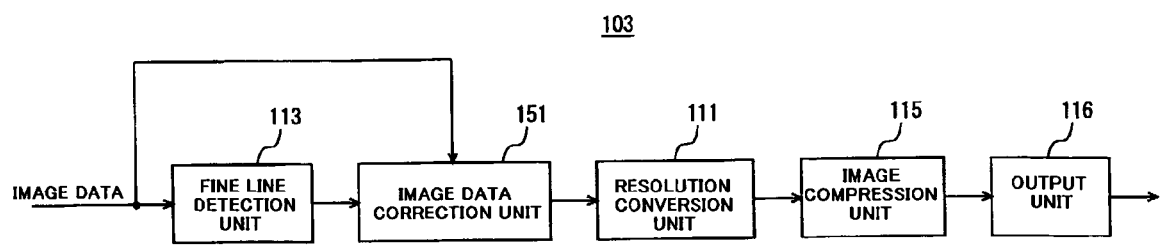
FIG. 22 is a block diagram showing the basic functions of the image processing unit of the image processing apparatus of a second embodiment.

FIG. 22 is a block diagram showing the basic functions of the image processing unit of the image processing apparatus of the second embodiment. Referring to FIG. 22, the image processing unit 103 includes a fine line detection unit 113 that reads image data stored in the image memory 104 and detects fine lines therefrom, an image data correction unit 151 that corrects the fine lines in the image data, a resolution conversion unit 111 that converts the corrected image data to a prescribed resolution, an image compression unit 115 that compresses the resolution-converted image that underwent resolution conversion by the resolution conversion unit 111, and an output unit 116 that outputs the compressed image to the storage unit 106 or the network controller 107.

The image data correction unit 151 determines whether or not any of the pixels in the image data belonging to fine lines in a fine line image generated by the fine line detection unit 113 constitute gaps, and corrects the pixel values of pixels determined to constitute gaps. The determination of whether or not a pixel is a gap is made by comparing the pixel value to a prescribed threshold value. The prescribed threshold value may be changed in accordance with the resolution of the image data and the post-conversion resolution. Any threshold value is acceptable so long as it is a value that can specify pixels that are expected to exhibit a decrease in pixel value after resolution conversion.

Figure 23:
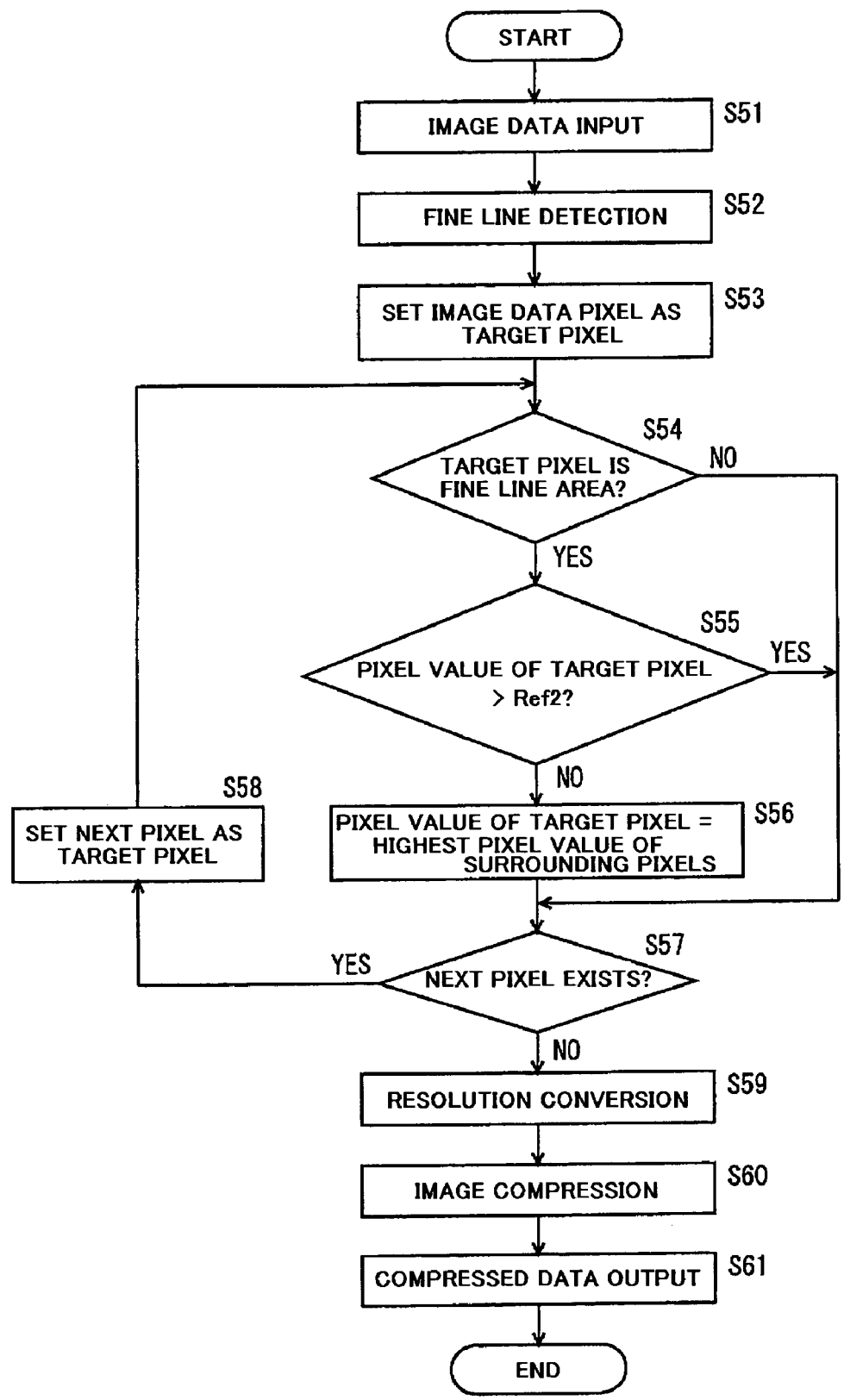
FIG. 23 is a flow chart showing the sequence of operations executed by the image processing apparatus of the second embodiment.

FIG. 23 is a flow chart showing the sequence of operations executed by the image processing apparatus of the second embodiment. Referring to FIG. 23, image data is first input to the image processing apparatus 100 (step S51). The image data is read from an original document by the image reader 102 or is received from another computer or MFP connected over a network, whereupon it is stored in the image memory 104. The image data stored in the image memory 104 is read out.

Fine lines are then detected from the image data read from the image memory 104 (step S52). This fine line detection process is identical to the fine line detection process described with reference to FIG. 18.

Next, in order to sequentially scan the pixels of the image data, the pixels included in the image data are designated as target pixels (step S53).

It is then determined whether or not a target pixel belongs to a fine line (step S54). If the target pixel is determined to belong to a fine line, the image processing apparatus 100A proceeds to step S55, while if the target pixel is determined not to belong to a fine line, the image processing apparatus 100A advances to step S57. The determination of whether or not a target pixel belongs to a fine line is made based on the fine line image generated in step S52.

In step S55, it is determined whether or not the pixel value of the target pixel exceeds a prescribed threshold value Ref2. If the pixel value of the target pixel exceeds the threshold value Ref2, the image processing apparatus 100A advances to step S57, but if not, the image processing apparatus 100A proceeds to step S56. If the pixel value of the target pixel does not exceed the threshold value Ref2, the pixel is expected to constitute a gap in a fine line after resolution conversion.

In step S56, the pixel value of the target pixel is replaced by the higher pixel value of the pixels surrounding the target pixel. As a result, because the pixels that are in fine lines in the image data and are expected to form a gap after resolution conversion are corrected, the appearance of gaps in fine lines after resolution conversion can be prevented.

In step S57, it is determined whether or not pixels exist in the resolution-converted image that have not been designated as a target pixel. If pixels that need to be designated as a target pixel still exist, the image processing apparatus 100A proceeds to step S58, while if no such pixels exist, the image processing apparatus 100A advances to step S59. In step S58, a pixel that needs to be designated a target pixel is designated as the next target pixel, whereupon the image processing apparatus 100A proceeds to step S54.

In step S59, the corrected image data is converted to a user-specified or preset resolution. As a result, a resolution-converted image is generated.

The resolution-converted image is then compressed using a user-specified compression method (step S60). It is also acceptable if the compression method is set in advance rather than specified by the user. The compressed image data is then sent to another apparatus over a network (step S61). The recipient may be input directly by the user from the operation panel 109 or set in advance.

According to the image processing apparatus of the second embodiment, because the fine line pixels in the image data are corrected prior to resolution conversion, fine lines can be reliably preserved after resolution conversion. Furthermore, there is no effect on image data areas other than fine lines after resolution conversion.

Third Embodiment

While the image processing apparatuses of the first and second embodiments were described above, the processes executed by these image processing apparatuses may be realized on an ordinary computer.

Figure 24:
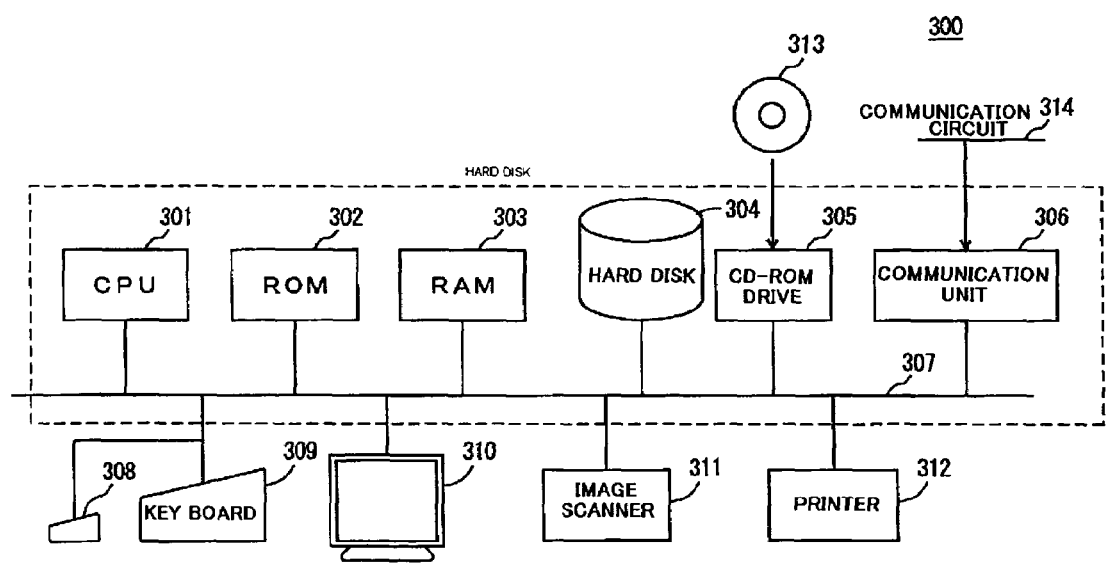
FIG. 24 is a block diagram showing the basic hardware construction of a computer.

FIG. 24 is a block diagram showing the basic hardware construction of a computer. Referring to FIG. 24, the computer 300 includes a CPU (Central Processing Unit) 301, a ROM (Read-Only Memory) 302 on which programs and the like sent to the operating system are stored, a RAM (Random-Access Memory) 303 used for loading of programs to be executed and for storage of data associated with programs being executed, a hard disk 304, a communication unit 306 used for connecting the computer 300 to a network 314, a mouse 308, a keyboard 309, a display unit 310, an image scanner 311, a printer 312, and a CD-ROM (Compact, Disc Read-Only Memory) drive 305, all of which are connected to a bus line 307. A CD-ROM 313 is mounted in the CD-ROM drive 305. Because the operations of the computer having the above construction are known in the art, they will not be described in detail here.

The operation panel 109 of the image processing apparatus 100 shown in FIG. 1 corresponds to the display unit 310 and mouse 308 or keyboard 309, the image reader 102 corresponds to the image scanner 311, the storage unit 106 corresponds to the hard disk 304, the image memory 104 corresponds to the RAM 303, the image processing unit 103, controller 101 and panel controller 108 correspond to the CPU 301, the network controller 107 corresponds to the communication unit 306, and the image forming unit 105 corresponds to the printer 312.

The computer 300 executes the processes shown in FIGS. 17, 18, 19, 21 and 23 by executing image processing programs via the CPU 301.

In general, these programs are stored and distributed on a storage medium such as the CD-ROM 313, are read from the recording medium via the CD-ROM drive 305 or the like and are temporarily stored on the hard disk 304. They are further read from the hard disk 304, loaded in the RAM 303 and executed by the CPU 301.

The recording media used are not limited to the CD-ROM 313 and the hard disk 304, and may comprise any medium that can preserve a program in a fixed fashion, such as a flexible disk, cassette tape, MO (Magneto-Optical Disk), MD (Mini-Disc) or DVD (Digital Versatile Disc), an IC card (including a memory card), or a semiconductor memory such as an optical card, a mask ROM, a EPROM, a EEPROM or a flash ROM.

The programs referred to above are not limited to programs that can-be executed directly by the CPU 301, and include source program-type programs, compressed programs, encoded programs and the like.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processing apparatus, comprising:
   an input unit that inputs image data,
   a fine line detection unit that detects fine lines from the image data,
   a resolution conversion unit that converts the image data to a prescribed resolution,
   a gap detection unit that detects gaps in fine lines in the resolution-converted image data, and
   a restoration unit that restores the detected gaps by the gap detection unit.

2. An image processing apparatus, comprising:
   an input unit that inputs image data,
   a fine line detection unit that detects fine lines from the image data, a resolution conversion unit that converts the image data to a prescribed resolution, and
   a restoration unit that restores the fine lines detected in the resolution-converted image data,
   wherein the fine line detection unit detects fine lines based on a ratio of the post-conversion resolution to the pre-conversion resolution.

3. An image processing apparatus, comprising:
   an input unit that inputs image data,
   a fine line detection unit that detects fine lines from the image data, a resolution conversion unit that converts the image data to a prescribed resolution, and
   a restoration unit that restores the fine lines detected in the resolution-converted image data,
   wherein the fine line detection unit comprising;
   a binarization unit that binarizes image data,
   a line thinning unit that generates first image data created by replacing the pixel values in the binarized image data with the lowest pixel value among pixels in a prescribed range,
   a line thickening unit that generates second image data by replacing the pixel values in the first image data with the higher pixel value among pixels in a prescribed range, and
   a fine line image generating unit that generates a fine line image by calculating the difference between the binarized image data and the second image.

4. The image processing apparatus according to claim 1, wherein the restoration unit replaces pixel values for gap pixels with the higher pixel value of the surrounding pixels.

5. An image processing apparatus, comprising:
   an input unit that inputs image data,
   a fine line detection unit that detects fine lines from the image data,
   a pixel value correction unit that corrects a pixel values of fine lines detected from the image data, the pixel values being expected to constitute a gap in the fine lines after resolution conversion and
   a resolution conversion unit that converts the corrected image data to a prescribed resolution.

6. The image processing apparatus according to claim 5, wherein the fine line detection unit detects fine lines having a appropriate thickness based on the resolution to which the image data is converted by the resolution conversion unit.

7. A computer readable medium encoded with an image processing computer program which executes on a computer the steps of:
   (a) inputting image data;
   (b) detecting fine lines from the input image data;
   (c) converting the image data to a prescribed resolution;
   (d) detecting gaps in fine lines in the resolution-converted image date; and
   (e) restoring the detected gaps by the step of detecting gaps.

8. A computer readable medium encoded with an image processing computer program which executes on a computer the steps of:
   (a) inputting image data;
   (b) detecting fine lines from the image data;
   (c) correcting pixel values of the fine lines detected in the image data, the pixel values being expected to constitute a gap in the fine line after resolution conversion; and
   (d) converting the corrected image data to a prescribed resolution.

9. An image processing apparatus for converting image data into a different resolution, comprising:
   a resolution conversion unit that converts first image data having a first resolution into a second resolution lower than the first resolution in order to obtain second image data, a gap detection unit that detects gaps in fine lines in the second image data that was obtained as a result of conversion by the resolution conversion unit, and a restoration unit that restores the gaps in fine lines detected by the gap detection unit.

10. The image processing apparatus according to claim 9, further comprising:

a fine line detection unit that detects fine lines in the first image data, wherein the gap detection unit detects gaps in fine lines based on the fine lines detected by the fine line detection unit and the second image data obtained as a result of conversion by the resolution conversion unit.

11. The image processing apparatus according to claim 10, wherein the fine line detection unit detects fine lines depending on the first resolution and the second resolution.

12. The image processing apparatus according to claim 9, wherein the restoration unit restores the gaps in fine lines detected by the gap detection unit to pixel values consistent with the surrounding pixels.

* * * * *

UNITED STATES PATENT AND TRADEMARK OFFICE
CERTIFICATE OF CORRECTION

PATENT NO. : 7,430,342 B2  
APPLICATION NO. : 10/980435  
DATED : September 30, 2008  
INVENTOR(S) : Takayuki Nabeshima et al.

It is certified that error appears in the above-identified patent and that said Letters Patent is hereby corrected as shown below:

Title Page, Item (75) Inventors: Replace

"Takayuki Nabeshima, Chiyoda-ku" with --Takayuki Nabeshima, Toyokawa-shi--

"Kazuhiro Ishiguro, Chiyoda-ku" with --Kazuhiro Ishiguro, Toyohashi-shi--

"Hideyuki Toriyama, Chiyoda-ku" with --Hideyuki Toriyama, Toyokawa-shi--

"Hiroyuki Suzuki, Chiyoda-ku" with --Hiroyuki Suzuki, Toyokawa-shi--

"Toru Maegawa, Hino" with --Toru Maegawa, Hino-shi--

In the Claims:

In Claim 7, column 20, line 49, delete "date" and replace with --data--

Signed and Sealed this

Twenty-third Day of December, 2008

JON W. DUDAS  
*Director of the United States Patent and Trademark Office*